(12) United States Patent
He

(10) Patent No.: US 10,992,351 B2
(45) Date of Patent: Apr. 27, 2021

(54) SIGNAL TRANSMISSION METHOD, NETWORK DEVICE, AND TERMINAL DEVICE

(71) Applicant: Huawei Technologies Co., Ltd., Shenzhen (CN)

(72) Inventor: Chuanfeng He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/984,876

(22) Filed: Aug. 4, 2020

(65) Prior Publication Data

US 2020/0366342 A1 Nov. 19, 2020

Related U.S. Application Data

(63) Continuation of application No. 16/588,336, filed on Sep. 30, 2019, now Pat. No. 10,756,787, which is a
(Continued)

(51) Int. Cl.
*H04B 7/0417* (2017.01)
*H04W 72/04* (2009.01)
(Continued)

(52) U.S. Cl.
CPC ........... *H04B 7/0421* (2013.01); *H04B 7/043* (2013.01); *H04B 7/0617* (2013.01);
(Continued)

(58) Field of Classification Search
CPC .... H04B 7/043; H04B 7/0617; H04B 7/0421; H04W 72/04; H04L 5/0007; H04L 5/0091; H04L 5/0048; H04L 5/0023
See application file for complete search history.

(56) References Cited

U.S. PATENT DOCUMENTS

2011/0280333 A1 11/2011 Yang et al.
2013/0157660 A1 6/2013 Awad et al.
(Continued)

FOREIGN PATENT DOCUMENTS

CN 103081550 A 5/2013
EP 2966922 A1 1/2016
(Continued)

OTHER PUBLICATIONS

"DL Control channel enhancements with carrier aggregation solutions," TSG-RAN WG1 #66, Athens, Greece, R1-112137 (Aug. 22-26, 2011).
(Continued)

*Primary Examiner* — Vineeta S Panwalkar
(74) *Attorney, Agent, or Firm* — Leydig, Voit & Mayer, Ltd.

(57) ABSTRACT

Embodiments of the present disclosure provide a signal transmission method, network device, and terminal device. The method includes: determining a first time-frequency resource; obtaining a second time-frequency resource and a third time-frequency resource based on the first time-frequency resource and a preset rule, where the third time-frequency resource includes at least one resource element (RE) at a predefined location in the first time-frequency resource, the second time-frequency resource includes a resource other than the third time-frequency resource in the first time-frequency resource, the preset rule indicates the predefined location, the second time-frequency resource is used to carry a beamformed control channel, and the third time-frequency resource is used to carry a reference signal of the beamformed control channel.

12 Claims, 11 Drawing Sheets

Related U.S. Application Data continuation of application No. 16/188,829, filed on Nov. 13, 2018, now Pat. No. 10,447,354, which is a continuation of application No. PCT/CN2016/082070, filed on May 13, 2016.

(51) Int. Cl.
*H04L 5/00* (2006.01)
*H04B 7/0426* (2017.01)
*H04B 7/06* (2006.01)

(52) U.S. Cl.
CPC .......... *H04L 5/0007* (2013.01); *H04L 5/0048* (2013.01); *H04L 5/0091* (2013.01); *H04W 72/04* (2013.01); *H04L 5/0023* (2013.01)

(56) References Cited

U.S. PATENT DOCUMENTS

2014/0119317 A1   5/2014   Kim et al.
2014/0140435 A1   5/2014   Zhang et al.
2015/0043474 A1   2/2015   Takeda et al.

FOREIGN PATENT DOCUMENTS

| JP | 2013197877 A | 9/2013 |
| JP | 2014517642 A | 7/2014 |
| WO | 2009057036 A2 | 5/2009 |
| WO | 2013002528 A2 | 1/2013 |

OTHER PUBLICATIONS

"CRS/PSCH RE collision resolution in Joint Transmission," 3GPP TSG RAN WG1 Meeting #70, Qingdao, China, R1-123175, 3rd Generation Partnership Project, Valbonne, France (Aug. 13-17, 2012).

"PDCCH Beamforming for L TE-A," 3GPP Draft, R1-091331, Seoul, Korea, pp. 1-2, XP050338929, 3rd Generation Partnership Project, Valbonne, France (Mar. 18, 2009).

"Beamformed CSI-RS for support of FD-MIMO," 3GPP Draft, R1-153880, vol. RAN WG1, Beijing, China, XP051001316, pp. 1-4, 3rd Generation Partnership Project, Valbonne, France (Aug. 23, 2015).

U.S. Appl. No. 16/188,829, filed Nov. 13, 2018.
U.S. Appl. No. 16/588,336, filed Sep. 30, 2019.
U.S. Appl. No. 16/929,986, filed Jul. 15, 2020.
U.S. Appl. No. 16/188,829, filed Nov. 13, 2019.
IN/201827043505, Office Action, dated Sep. 30, 2020

SIGNAL TRANSMISSION METHOD, NETWORK DEVICE, AND TERMINAL DEVICE

CROSS-REFERENCE TO RELATED APPLICATIONS

This application is a continuation of U.S. patent application Ser. No. 16/588,336, filed on Sep. 30, 2019, which is a continuation of U.S. patent application Ser. No. 16/188,829, filed on Nov. 13, 2018 (now U.S. Pat. No. 10,447,354), which is a continuation of International Application No. PCT/CN2016/082070, filed on May 13, 2016. All of the afore-mentioned patent applications are hereby incorporated by reference in their entireties.

TECHNICAL FIELD

Embodiments of the present disclosure relate to the field of communications technologies, and in particular, to a signal transmission method, network device, and terminal device.

BACKGROUND

In wireless communications, in a scenario of using a low-frequency carrier, a wireless signal has a relatively small path loss, and a beam formed at each antenna port is a wide beam; and therefore, users of an entire cell can be covered. For example, as shown in FIG. 1, a broadcast channel, a system message, paging, and the like of a network device may be transmitted by using a wide beam, to better cover a terminal device 1 and a terminal device 2.

However, in a high-frequency scenario, as shown in FIG. 2, a path loss of a wireless signal increases. If a wide beam is still used for transmission, cell coverage becomes very small and cannot cover a relatively remote terminal device 3 and terminal device 4.

An antenna distance may become smaller in high frequency, so that a unit area can accommodate more antennas. Therefore, a large antenna gain may be obtained by using a massive multiple-input multiple-output (massive MIMO) beamforming technology, to compensate for the path loss. There may be a large quantity of antennas even hundreds of antennas in massive MIMO. When a large antenna gain is obtained, a formed beam is very narrow in width. One narrow beam can cover only a part of an area, but cannot cover all users in a cell. For example, as shown in FIG. 3, a beam B2 can cover only a terminal device 5, but cannot cover a terminal device 6.

In a high-frequency multi-beam transmission scenario, to serve the users in the cell, different beams may need to serve the users in the cell in a time division manner, and the beams need common channels such as a broadcast channel, a synchronization channel, and a control channel to cover all the users in the cell, so that the users in the cell are synchronized and obtain a necessary system message to access the cell.

A beamformed control channel is sent by using an existing method for sending a control channel. For example, an existing control channel is a physical downlink control channel (PDCCH), and a beamformed control channel is a beamformed PDCCH. In this case, in one subframe, there may be both the PDCCH with large coverage used to serve an old terminal device, and the beamformed PDCCH used to serve a terminal device in enlarged coverage. The PDCCH with wide coverage is demodulated by using a common reference signal (CRS) with wide coverage. However, the beamformed PDCCH cannot be demodulated by using the existing CRS, and needs to be demodulated by using a beamformed reference signal. Therefore, when the beamformed PDCCH is used, a UE cannot correctly receive the beamformed PDCCH if there is no corresponding beamformed reference signal.

Therefore, how to transmit a beamformed control channel and a reference signal of the beamformed control channel becomes a problem that urgently needs to be resolved.

SUMMARY

Embodiments of the present disclosure provide a signal transmission method, network device, and terminal device. In this method, a beamformed control channel and a reference signal of the beamformed control channel can be transmitted.

According to a first aspect, a signal transmission method is provided, and the method includes:

determining a first time-frequency resource, where the first time-frequency resource is a first candidate resource in a plurality of candidate resources;

obtaining a second time-frequency resource and a third time-frequency resource based on the first time-frequency resource and a preset rule, where the third time-frequency resource includes at least one resource element RE at a predefined location in the first time-frequency resource, the second time-frequency resource includes a resource other than the third time-frequency resource in the first time-frequency resource, the preset rule indicates the predefined location, the second time-frequency resource is used to carry a beamformed control channel, and the third time-frequency resource is used to carry a reference signal of the beamformed control channel; and respectively transmitting the beamformed control channel and the reference signal of the beamformed control channel to a terminal device by using the second time-frequency resource and the third time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

It should be noted that the term "candidate resource" according to this embodiment of the present disclosure is defined as follows:

One time-frequency resource set may be divided into a plurality of time-frequency resource subsets, and the candidate resource is a resource that includes one or more time-frequency resource subsets selected based on a specific rule.

For example, in a Long Term Evolution (LTE) system, the time-frequency resource set may be time-frequency resources corresponding to first three orthogonal frequency division multiplexing (OFDM) symbols in a subframe. The time-frequency resource subset may be a control channel element (CCE) or an enhanced control channel element (ECCE). The candidate resource is one or more subsets selected based on the specific rule. For example, the candidate resource includes one CCE, two CCEs, four CCEs, or eight CCEs, and a corresponding aggregation level is respectively 1, 2, 4, or 8.

For example, a network device may determine the first time-frequency resource based on an existing method for determining a PDCCH resource in LTE.

Optionally, the determining a first time-frequency resource includes:

determining an aggregation level, where the aggregation level is used to indicate a size of the candidate resource; and selecting one candidate resource from a set of the plurality of candidate resources corresponding to the aggregation level, and using the candidate resource as the first time-frequency resource.

Specifically, the network device may first determine the aggregation level. The aggregation level is used to indicate the size of the candidate resource. For example, the network device may first determine a PDCCH format. A PDCCH format corresponds to a specific aggregation level, the aggregation level corresponds to a quantity of CCEs carrying a PDCCH, and the quantity of CCEs corresponds to a size of a candidate resource in the PDCCH format.

Then, the candidate resource is selected from the set of the plurality of candidate resources corresponding to the aggregation level, and the candidate resource is used as the first time-frequency resource.

It should be understood that the aggregation level may include 4 and 8; 1, 2, 4, and 8; or the like. For detailed description of the aggregation level, refer to a definition in an existing standard. Details are not described herein.

It should be understood that the first time-frequency resource may include a plurality of (a quantity corresponds to an aggregation level) resource element (RE) sets, and each of the plurality of RE sets includes a same fixed quantity of REs.

For example, in LTE, an RE set is a control channel element CCE, a PDCCH is carried by at least one CCE, and a quantity of CCEs carrying the PDCCH is determined by an aggregation level. For example, a quantity of CCEs may be 1, 2, 4, or 8. One CCE includes nine resource element groups (REGs), and one REG includes four REs. In other words, one RE set may include 36 REs. Only LTE is used as an example herein for description. In different systems, one RE set may include another quantity of REs. This embodiment of the present disclosure is not limited thereto.

In the LTE system, the first time-frequency resource may be obtained through respectively aggregating one control channel element CCE, two consecutive CCEs, four consecutive CCEs, or eight consecutive CCEs in first three orthogonal frequency division multiplexing OFDM symbols in a subframe for an aggregation level 1, 2, 4, or 8. For example, as shown in FIG. 5, the first time-frequency resource includes eight CCEs, respectively CCE 0 to CCE 7.

In other words, the candidate resource set herein may correspond to an existing resource set carrying an existing PDCCH.

In this embodiment of the present disclosure, the first time-frequency resource may be used to carry a beamformed PDCCH, and may be used to carry a reference signal of the beamformed PDCCH.

It should be understood that the plurality of candidate resources in this embodiment of the present disclosure may include candidate resources corresponding to all aggregation levels, or may include candidate resources corresponding to one aggregation level. This is not limited in this embodiment of the present disclosure.

It should be understood that the foregoing describes a process of determining the first time-frequency resource based on the existing method for determining a PDCCH resource in LTE, and describes an example in which the first time-frequency resource may include a plurality of CCEs. In this embodiment of the present disclosure, alternatively, the first time-frequency resource may be the first time-frequency resource that is determined by the network device based on an existing method for determining an enhanced physical downlink control channel (EPDCCH) resource in LTE. The EPDCCH is carried by at least one ECCE. A quantity of ECCEs carrying the EPDCCH is determined based on an EPDCCH format. Each EPDCCH format corresponds to a specific aggregation level, and the aggregation level corresponds to a specific quantity of ECCEs. An EPDCCH candidate resource set may correspond to a resource set that includes a specific quantity of ECCEs corresponding to an EPDCCH format. Each ECCE may include four or eight EREGs. The aggregation level corresponding to the EPDCCH format includes 1, 2, 4, 8, 16, and 32. In other words, a corresponding first time-frequency resource may include 1, 2, 4, 8, 16, and 32 ECCEs.

It should be understood that the preset rule in this embodiment of the present disclosure may be a rule preset in the system. In other words, the preset rule may be a rule on which the network device and the terminal device preagree. After the first resource is determined, the network device and the terminal device may obtain the second resource and the third resource based on the preset rule.

It should be understood that the preset rule may be a rule on which the network device and the terminal device preagree. After the first resource is determined, the network device and the terminal device may obtain the second resource and the third resource based on the preset rule. Alternatively, the preset rule may be notified by the network device to the terminal device by using signaling. To be specific, the network device sends a message in advance to agree on the preset rule with the terminal device.

Correspondingly, in another embodiment, before 410, the method may further include: sending an indication message to the terminal device, where the indication message indicates the predefined location.

For example, the indication message may be a radio resource control (RRC) signaling message. This embodiment of the present disclosure is not limited thereto.

Optionally, the first time-frequency resource includes a plurality of resource element RE sets, each of the plurality of RE sets includes a same fixed quantity of REs, and the third time-frequency resource includes an RE at a preset location in each of the plurality of RE sets.

Optionally, the first time-frequency resource includes a plurality of resource element RE sets, each of the plurality of RE sets includes a same fixed quantity of REs, and the third time-frequency resource includes all REs in at least one of the plurality of RE sets.

According to a second aspect, a signal transmission method is provided, and the method includes:

detecting a first time-frequency resource, where the first time-frequency resource is a first candidate resource in a plurality of candidate resources;

obtaining a second time-frequency resource and a third time-frequency resource based on the first time-frequency resource and a preset rule, where the third time-frequency resource includes at least one resource element RE at a predefined location in the first time-frequency resource, the second time-frequency resource includes a resource other than the third time-frequency resource in the first time-frequency resource, the preset rule indicates the predefined location, the second time-frequency resource is used to carry a beamformed control channel, and the third time-frequency resource is used to carry a reference signal of the beamformed control channel; and demodulating, based on the reference signal that is of the beamformed control channel and that is carried in the third time-frequency resource, the beamformed control channel carried in the second time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

It should be understood that the second aspect corresponds to the foregoing first aspect, the first aspect is performed by a network device, and the second aspect may be performed by a terminal device. For corresponding features of the method on a terminal side, refer to the foregoing description of the first aspect. Therefore, for brevity, detailed description is omitted.

Optionally, the first time-frequency resource includes a plurality of resource element RE sets, each of the plurality of RE sets includes a same fixed quantity of REs, and the third time-frequency resource includes an RE at a preset location in each of the plurality of RE sets.

Optionally, the first time-frequency resource includes a plurality of resource element RE sets, each of the plurality of RE sets includes a same fixed quantity of REs, and the third time-frequency resource includes all REs in at least one of the plurality of RE sets.

Optionally, before the detecting a first time-frequency resource, the method further includes:

receiving an indication message, where the indication message indicates the preset rule.

According to a third aspect, a signal transmission method is provided, including:

determining a first time-frequency resource, where the first time-frequency resource is a first candidate resource in a plurality of candidate resources, and the first time-frequency resource is used to carry a beamformed control channel;

determining a second time-frequency resource, where the second time-frequency resource is a second candidate resource in the plurality of candidate resources, or the second time-frequency resource is a resource other than the plurality of candidate resources configured for a terminal device, and the second time-frequency resource is used to carry a reference signal of the beamformed control channel; and respectively transmitting the beamformed control channel and the reference signal of the beamformed control channel to the terminal device by using the first time-frequency resource and the second time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

It should be noted that the term "candidate resource" according to this embodiment of the present disclosure is defined as follows:

One time-frequency resource set may be divided into a plurality of time-frequency resource subsets, and the candidate resource is a resource that includes one or more time-frequency resource subsets selected based on a specific rule.

For example, in an LTE system, the time-frequency resource set may be time-frequency resources corresponding to first three OFDM symbols in a subframe. The time-frequency resource subset may be a CCE or an ECCE. The candidate resource is one or more subsets selected based on the specific rule. The candidate resource includes one CCE, two CCEs, four CCEs, or eight CCEs, and a corresponding aggregation level is respectively 1, 2, 4, or 8.

For example, a network device may determine the first time-frequency resource based on an existing method for determining a PDCCH resource in LTE.

Specifically, the network device may first determine an aggregation level. The aggregation level is used to indicate a size of the candidate resource. For example, the network device may first determine a PDCCH format. A PDCCH format corresponds to a specific aggregation level, the aggregation level corresponds to a quantity of CCEs carrying a PDCCH, and the quantity of CCEs corresponds to a size of a candidate resource in the PDCCH format.

Then, the candidate resource is selected from a set of the plurality of candidate resources corresponding to the aggregation level, and the candidate resource is used as the first time-frequency resource.

It should be understood that the aggregation level may include 4 and 8; 1, 2, 4, and 8; or the like. For detailed description of the aggregation level, refer to a definition in an existing standard. Details are not described herein.

It should be understood that the first time-frequency resource may include a plurality of (a quantity corresponds to an aggregation level) resource element RE sets, and each of the plurality of RE sets includes a same fixed quantity of REs.

For example, in LTE, an RE set is a control channel element CCE, a PDCCH is carried by at least one CCE, and a quantity of CCEs carrying the PDCCH is determined by an aggregation level. For example, a quantity of CCEs may be 1, 2, 4, or 8. One CCE includes nine resource element groups (REGs), and one REG includes four REs. In other words, one RE set may include 36 REs. Only LTE is used as an example herein for description. In different systems, one RE set may include another quantity of REs. This embodiment of the present disclosure is not limited thereto.

In the LTE system, the first time-frequency resource may be obtained through respectively aggregating one control channel element CCE, two consecutive CCEs, four consecutive CCEs, or eight consecutive CCEs in first three orthogonal frequency division multiplexing OFDM symbols in a subframe for an aggregation level 1, 2, 4, or 8. For example, as shown in FIG. 5, the first time-frequency resource includes eight CCEs, respectively CCE 0 to CCE 7.

In other words, the candidate resource set herein may correspond to an existing resource set carrying an existing PDCCH.

In this embodiment of the present disclosure, the first time-frequency resource may be used to carry a beamformed PDCCH.

It should be understood that the plurality of candidate resources in this embodiment of the present disclosure may include candidate resources corresponding to all aggregation levels, or may include candidate resources corresponding to one aggregation level. This is not limited in this embodiment of the present disclosure.

It should be understood that the foregoing describes a process of determining the first time-frequency resource based on the existing method for determining a PDCCH resource in LTE, and describes an example in which the first time-frequency resource may include a plurality of CCEs. In this embodiment of the present disclosure, alternatively, the first time-frequency resource may be the first time-frequency resource that is determined by the network device based on an existing method for determining an EPDCCH resource in LTE. The EPDCCH is carried by at least one ECCE. A quantity of ECCEs carrying the EPDCCH is determined based on an EPDCCH format. Each EPDCCH format corresponds to a specific aggregation level, and the aggregation level corresponds to a specific quantity of ECCEs. An EPDCCH candidate resource set may correspond to a resource set that includes a specific quantity of ECCEs corresponding to an EPDCCH format. Each ECCE may include four or eight EREGs. The aggregation level corresponding to the EPDCCH format includes 1, 2, 4, 8, 16, and 32. In other words, a corresponding first time-frequency resource may include 1, 2, 4, 8, 16, and 32 ECCEs.

Specifically, the second time-frequency resource is a resource other than the first time-frequency resource, and the second time-frequency resource is used to carry the reference signal of the beamformed control channel.

It should be understood that the second time-frequency resource in this embodiment of the present disclosure has a plurality of feasible manners. The following separately describes in detail a case in which the second time-frequency resource is the second candidate resource and a case in which the second time-frequency resource is the resource other than the plurality of candidate resources configured for the terminal device.

When the second time-frequency resource is the second candidate resource in the plurality of candidate resources,
    the second time-frequency resource may be the second candidate resource predefined in the plurality of candidate resources.

In other words, the second time-frequency resource is a predefined resource, and the predefined resource is one of the plurality of candidate resources, namely, the second candidate resource.

In other words, the second resource is a predefined resource, to be specific, a resource predefined in the system or a resource on which the network device and the terminal device preagree. Both the network device and the terminal device learn of a location of the second resource in advance, and the second resource carries the reference signal of the beamformed control channel.

It should be understood that the second time-frequency resource and the first time-frequency resource may have a same size (for example, a same aggregation level) or may have different sizes. This is not limited in this embodiment of the present disclosure.

For example, the second time-frequency resource and the first time-frequency resource may have a same size (for example, a same aggregation level). In other words, the second time-frequency resource is a candidate resource other than the first time-frequency resource in the set of the plurality of candidate resources corresponding to the first time-frequency resource. For example, in the LTE system, each of aggregation levels of the first time-frequency resource and the second time-frequency resource is 1, 2, 4, 8, or the like.

For another example, a size of the second time-frequency resource is different from a size of the second time-frequency resource. In other words, the second time-frequency resource is a candidate resource in another set of candidate resources. For example, in the LTE system, an aggregation level of the first time-frequency resource is 2, and an aggregation level of the second candidate resource is 4 or the like.

In addition, when the second time-frequency resource is the second candidate resource in the plurality of candidate resources,
    the second time-frequency resource is the second candidate resource configured for the terminal device.

For example, the network device may send, to the terminal device, a message that is used to configure the second resource as the second candidate resource. For example, the message may be an RRC signaling message. However, this embodiment of the present disclosure is not limited thereto.

In addition, when the second time-frequency resource is the second candidate resource in the plurality of candidate resources,
    the network device may determine the second candidate time-frequency resource based on a preset mapping relationship between the first time-frequency resource and the second time-frequency resource.

In a case, the second candidate time-frequency resource may be one of candidate resources that have a same size as the first time-frequency resource and that are in the plurality of candidate resources.

For example, the network device may determine the second time-frequency resource based on the preset mapping relationship between the first time-frequency resource and the second time-frequency resource. The second time-frequency resource is another candidate resource other than the first time-frequency resource in the candidate resources that have a same size.

For example, the mapping relationship indicates that the second time-frequency resource may be a candidate resource adjacent to the first time-frequency resource, a time-frequency resource at a fixed distance from the first time-frequency resource, or the like.

It should be understood that the mapping relationship may be preagreed on by the network device and the terminal device, for example, may be sent by the network device to the terminal device in advance. This is not limited in this embodiment of the present disclosure.

In another case, the second candidate time-frequency resource is a candidate resource that is in candidate resources of a specified size in the plurality of candidate resources and that does not overlap with the first time-frequency resource.

For example, the specified size may be an aggregation level 1, 2, 4, 8, or the like. The specified size may be the same as or different from the size of the first time-frequency resource. This is not limited in this embodiment of the present disclosure.

For example, the specified size may be an aggregation level 4, and the second time-frequency resource may be a candidate resource that is in a plurality of candidate resources whose aggregation levels are 4 and that has a smallest or a largest number in candidate resources that do not overlap with the first time-frequency resource. This embodiment of the present disclosure is not limited thereto. However, it should be understood that the network device and the terminal device need to have a consistent rule for determining the second time-frequency resource. For example, both the network device and the terminal device agree that the second time-frequency resource is a candidate resource that has a smallest number in a set of a plurality of candidate resources of a specified size and that does not overlap with the first time-frequency resource.

When the second time-frequency resource is the resource other than the plurality of candidate resources configured for the terminal device,
the second time-frequency resource includes a resource other than the first time-frequency resource configured by the network device for the terminal device.

For example, the second time-frequency resource includes a time-frequency resource corresponding to another reference signal other than a common reference signal (CRS), or the second time-frequency resource includes a time-frequency resource corresponding to a data channel.

Specifically, the network device may send an indication message for configuration to the terminal device. The indication message indicates a location of the second time-frequency resource. For example, the indication message may be an RRC signaling message. However, this embodiment of the present disclosure is not limited thereto.

For example, in LTE, the second time-frequency resource may be a time-frequency resource in a fourth to a $14^{th}$ OFDM symbols in a subframe.

For example, the second time-frequency resource may include a resource that corresponds to a PDSCH and that is in the fourth to the $14^{th}$ OFDM symbols in the subframe.

Specifically, the second time-frequency resource may include at least one RE in a zero-power user status information-reference signal zero-power CSI-RS resource configured for the user equipment.

Alternatively, the third time-frequency resource may include at least one RE that is in the fourth to the $14^{th}$ OFDM symbols in the subframe and that is in a non-zero power user status information-reference signal non-zero power CSI-RS resource configured for the user equipment.

Therefore, in this embodiment of the present disclosure, the existing first time-frequency resource carrying a control channel carries the beamformed control channel, and another resource (the second time-frequency resource) carries the reference signal of the beamformed control channel, to send the beamformed control channel and the reference signal of the beamformed control channel. In this way, it becomes possible to improve coverage of a control channel through beamforming in the existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

According to a fourth aspect, a signal transmission method is provided, including:
detecting a first time-frequency resource, where the first time-frequency resource is a first candidate resource in a plurality of candidate resources, and the first time-frequency resource is used to carry a beamformed control channel;
detecting a second time-frequency resource, where the second time-frequency resource is a second candidate resource in the plurality of candidate resources, or the second time-frequency resource is a resource other than the plurality of candidate resources configured for a terminal device, and the second time-frequency resource is used to carry a reference signal of the beamformed control channel; and
demodulating, based on the reference signal that is of the beamformed control channel and that is carried in the second time-frequency resource, the beamformed control channel carried in the first time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

It should be understood that the fourth aspect corresponds to the foregoing third aspect, the third aspect is performed by a network device, and the fourth aspect may be performed by the terminal device. For corresponding features of the method on a terminal side, refer to the foregoing description of the third aspect. Therefore, for brevity, detailed description is omitted.

Optionally, when the second time-frequency resource is the second candidate resource in the plurality of candidate resources,
the second time-frequency resource is the second candidate resource predefined in the plurality of candidate resources.

Optionally, when the second time-frequency resource is the second candidate resource in the plurality of candidate resources,
the second time-frequency resource is the second candidate resource configured for the terminal device.

Optionally, when the second time-frequency resource is the resource other than the plurality of candidate resources configured for the terminal device, the second time-frequency resource includes a time-frequency resource corresponding to another reference signal other than a common reference signal (CRS), or the second time-frequency resource includes a time-frequency resource corresponding to a data channel.

Optionally, before the detecting a second time-frequency resource, the method further includes:

receiving an indication message sent by the network device, where the indication message indicates a location of the second time-frequency resource.

Optionally, when the second time-frequency resource is the second candidate resource in the plurality of candidate resources, the second time-frequency resource is the second candidate resource determined based on a preset mapping relationship between the first time-frequency resource and the second time-frequency resource.

Optionally, the second candidate time-frequency resource is one of candidate resources that have a same size as the first time-frequency resource and that are in the plurality of candidate resources.

Optionally, the second candidate time-frequency resource is a candidate resource that is in candidate resources of a specified size in the plurality of candidate resources and that does not overlap with the first time-frequency resource.

According to a fifth aspect, a network device is provided and is configured to perform the method in the first aspect, any possible implementation of the first aspect, the third aspect, or any possible implementation of the third aspect. Specifically, the network device includes a unit configured to perform the foregoing method.

According to a sixth aspect, a terminal device is provided and is configured to perform the method in the second aspect, any possible implementation of the second aspect, the fourth aspect, or any possible implementation of the fourth aspect. Specifically, the terminal device includes a unit configured to perform the foregoing method.

According to a seventh aspect, a computer-readable medium is provided and is configured to store a computer program. The computer program includes an instruction used to perform the method in the first aspect, any possible implementation of the first aspect, the third aspect, or any possible implementation of the third aspect.

According to an eighth aspect, a computer-readable medium is provided and is configured to store a computer program. The computer program includes an instruction used to perform the method in the second aspect, any possible implementation of the second aspect, the fourth aspect, or any possible implementation of the fourth aspect.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
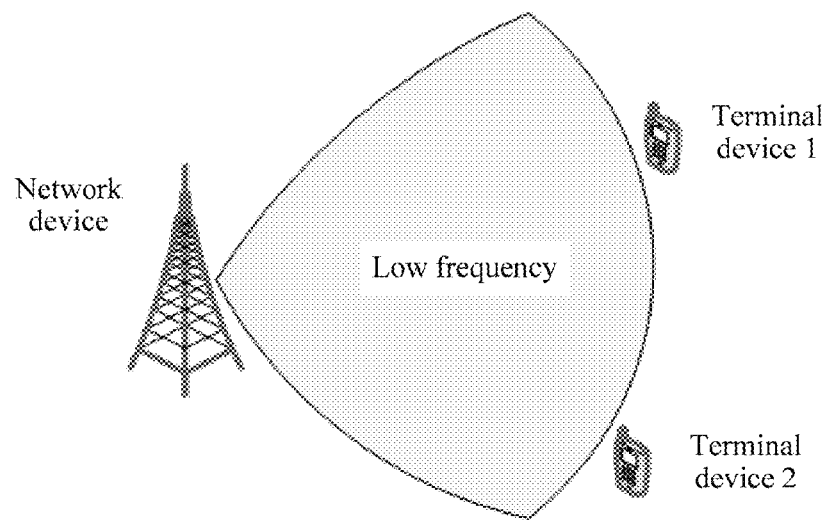
FIG. 1 is a schematic diagram of beam coverage.
Figure 2:
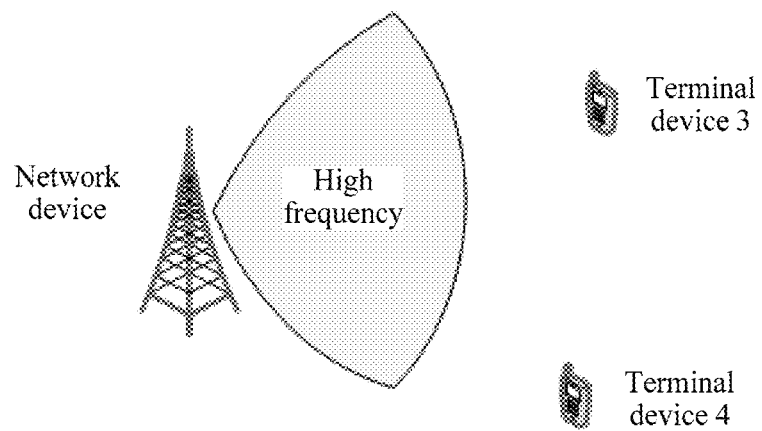
FIG. 2 is another schematic diagram of beam coverage.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure can be applied to various communications systems such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), a Universal Mobile Telecommunications System (UMTS), and a Worldwide Interoperability for Microwave Access (WiMAX) communications system. In the embodiments of the present disclosure, only LTE is used as an example for description. The present disclosure is not limited thereto.

It should also be understood that, in the embodiments of the present disclosure, a network device may be a base transceiver station (BTS) in a GSM system or a Code Division Multiple Access (CDMA) system, a NodeB (NB) in a WCDMA system, an evolved NodeB (Evolved NodeB, eNB, or eNodeB) in an LTE system, or a radio controller in a cloud radio access network (CRAN). Alternatively, a network device may be a relay station, an access point, an in-vehicle device, a wearable device, a network-side device in a future 5G network, a network device in a future evolved public land mobile network (PLMN), or the like.

A terminal device may be referred to as an access terminal, a user equipment (UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communications function, a computing device, another processing device connected to a wireless modem, an in-vehicle device, a wearable device, a terminal device in a future 5G network, a terminal device in a future evolved public land mobile network (PLMN), or the like.

It should be noted that the term "candidate resource" according to the embodiments of the present disclosure is defined as follows:

One time-frequency resource set may be divided into a plurality of time-frequency resource subsets, and the candidate resource is a resource that includes one or more time-frequency resource subsets selected based on a specific rule.

For example, in an LTE system, the time-frequency resource set may be time-frequency resources corresponding to first three OFDM symbols in a subframe. The time-frequency resource subset may be a CCE or an ECCE. The candidate resource is one or more subsets selected based on the specific rule. The candidate resource includes one CCE, two CCEs, four CCEs, or eight CCEs, and a corresponding aggregation level is respectively 1, 2, 4, or 8.

Figure 4:
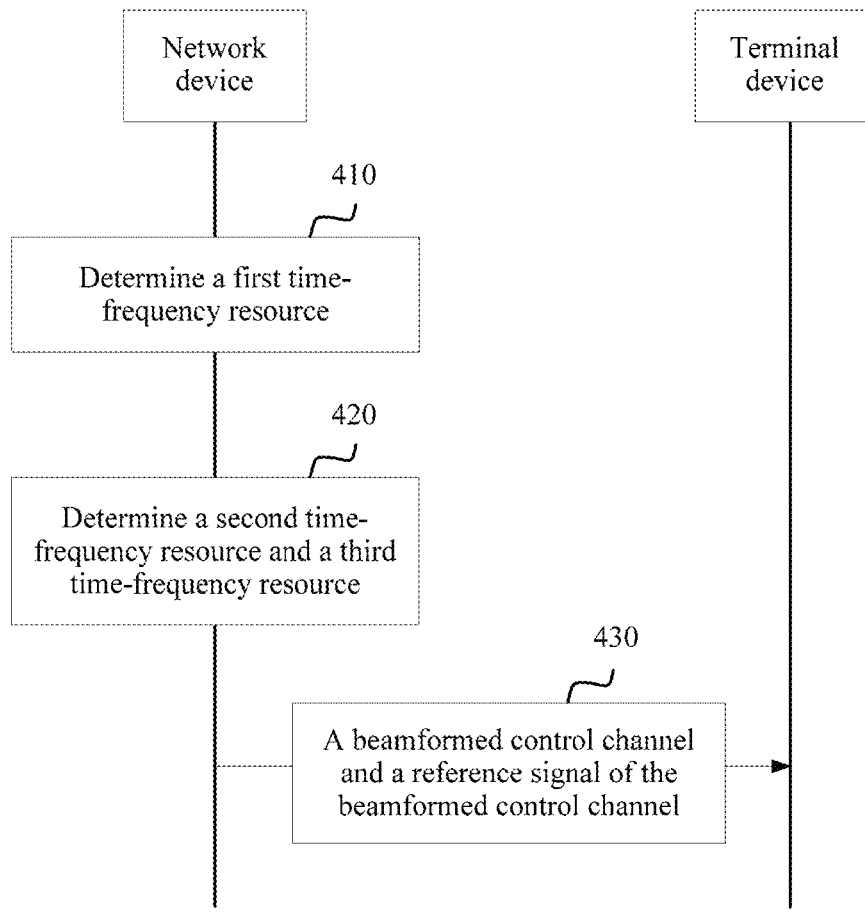
FIG. 4 is a schematic flowchart of a signal transmission method according to an embodiment of the present disclosure.

FIG. 4 is a schematic flowchart of a signal sending method according to an embodiment of the present disclosure. The method shown in FIG. 4 may be applied to the foregoing various communications systems. In FIG. 4, a detailed description is provided by using only an example in which a control channel is a PDCCH in an LTE system. However, this embodiment of the present disclosure is not limited thereto. In other words, various terms in this embodiment of the present disclosure may have different names in different systems. This is not limited in this embodiment of the present disclosure. A communications system in this embodiment of the present disclosure includes a network device and a terminal device. A method 400 shown in FIG. 4 includes the following steps.

410. The network device determines a first time-frequency resource.

Specifically, the network device determines the first time-frequency resource. The first time-frequency resource is a first candidate resource in a plurality of candidate resources.

In other words, the first time-frequency resource is a candidate resource in a set of the plurality of candidate resources.

For example, the network device may determine the first time-frequency resource based on an existing method for determining a PDCCH resource in LTE.

Specifically, the network device may first determine an aggregation level. The aggregation level is used to indicate a size of the candidate resource. For example, the network device may first determine a PDCCH format. A PDCCH format corresponds to a specific aggregation level, the aggregation level corresponds to a quantity of CCEs carrying a PDCCH, and the quantity of CCEs corresponds to a size of a candidate resource in the PDCCH format.

Then, the candidate resource is selected from a set of a plurality of candidate resources corresponding to the aggregation level, and the candidate resource is used as the first time-frequency resource.

It should be understood that the aggregation level may include 4 and 8; 1, 2, 4, and 8; or the like. For detailed description of the aggregation level, refer to a definition in an existing standard. Details are not described herein.

It should be understood that the first time-frequency resource may include a plurality of (a quantity corresponds to an aggregation level) resource element RE sets, and each of the plurality of RE sets includes a same fixed quantity of REs.

For example, in LTE, an RE set is a control channel element CCE, a PDCCH is carried by at least one CCE, and a quantity of CCEs carrying the PDCCH is determined by an aggregation level. For example, a quantity of CCEs may be 1, 2, 4, or 8. One CCE includes nine resource element groups (REGs), and one REG includes four REs. In other words, one RE set may include 36 REs. Only LTE is used as an example herein for description. In different systems, one RE set may include another quantity of REs. This embodiment of the present disclosure is not limited thereto.

Figure 5:
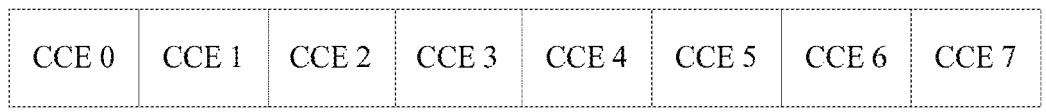
FIG. 5 is a schematic diagram of resource distribution according to an embodiment of the present disclosure.

In the LTE system, the first time-frequency resource may be obtained through respectively aggregating one control channel element CCE, two consecutive CCEs, four consecutive CCEs, or eight consecutive CCEs in first three orthogonal frequency division multiplexing OFDM symbols in a subframe for an aggregation level 1, 2, 4, or 8. For example, as shown in FIG. 5, the first time-frequency resource includes eight CCEs, respectively CCE 0 to CCE 7.

In other words, the candidate resource set herein may correspond to an existing resource set carrying an existing PDCCH.

In this embodiment of the present disclosure, the first time-frequency resource may be used to carry a beamformed PDCCH, and may be used to carry a reference signal of the beamformed PDCCH.

It should be understood that the plurality of candidate resources in this embodiment of the present disclosure may include candidate resources corresponding to all aggregation levels, or may include candidate resources corresponding to one aggregation level. This is not limited in this embodiment of the present disclosure.

It should be understood that the foregoing describes a process of determining the first time-frequency resource based on the existing method for determining a PDCCH resource in LTE, and describes an example in which the first time-frequency resource may include a plurality of CCEs. In this embodiment of the present disclosure, alternatively, the first time-frequency resource may be the first time-frequency resource that is determined by the network device based on an existing method for determining an EPDCCH resource in LTE. The EPDCCH is carried by at least one ECCE. A quantity of ECCEs carrying the EPDCCH is determined based on an EPDCCH format. Each EPDCCH format corresponds to a specific aggregation level, and the aggregation level corresponds to a specific quantity of ECCEs. An EPDCCH candidate resource set may correspond to a resource set that includes a specific quantity of ECCEs corresponding to an EPDCCH format. Each ECCE may include four or eight EREGs. The aggregation level corresponding to the EPDCCH format includes 1, 2, 4, 8, 16, and 32. In other words, a corresponding first time-frequency resource may include 1, 2, 4, 8, 16, and 32 ECCEs.

Therefore, in this embodiment of the present disclosure, based on the existing method, the first resource is determined for carrying a beamformed control channel and a reference signal subsequently. Because this is the same as an existing manner, sending a beamformed control channel and a reference signal of the beamformed control channel in this embodiment of the present disclosure has no impact on or has slight impact on compatibility of a conventional terminal device.

420. The network device obtains a second time-frequency resource and a third time-frequency resource.

Specifically, the network device obtains the second time-frequency resource and the third time-frequency resource based on the first time-frequency resource and a preset rule. The third time-frequency resource includes at least one resource element RE at a predefined location in the first time-frequency resource, and the second time-frequency resource includes a resource other than the third time-frequency resource in the first time-frequency resource. The preset rule indicates the predefined location. The second time-frequency resource is used to carry a beamformed control channel, and the third time-frequency resource is used to carry a reference signal of the beamformed control channel.

In other words, in this embodiment of the present disclosure, the existing first time-frequency resource carrying a control channel carries both the beamformed control channel and the reference signal of the beamformed control channel, to send the beamformed control channel and the reference signal of the beamformed control channel. In this way, it becomes possible to improve coverage of a control channel through beamforming in the existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

It should be understood that the preset rule in this embodiment of the present disclosure may be a rule preset in the system. In other words, the preset rule may be a rule on which the network device and the terminal device preagree. After the first resource is determined, the network device and the terminal device may obtain the second resource and the third resource based on the preset rule.

Specifically, the third time-frequency resource may include the at least one resource element RE in the first time-frequency resource, and the second time-frequency resource includes the resource other than the third time-frequency resource in the first time-frequency resource.

Specifically, the third time-frequency resource may include an RE in at least one of the foregoing plurality of RE sets.

For example, the third time-frequency resource may include only one RE in one RE set; or may include REs in a plurality of RE sets, where one RE set has only one RE that belongs to the third time-frequency resource; or may include an RE in each RE set.

For another example, the third time-frequency resource may include an RE at a preset location in each of the foregoing plurality of RE sets.

Figure 3:
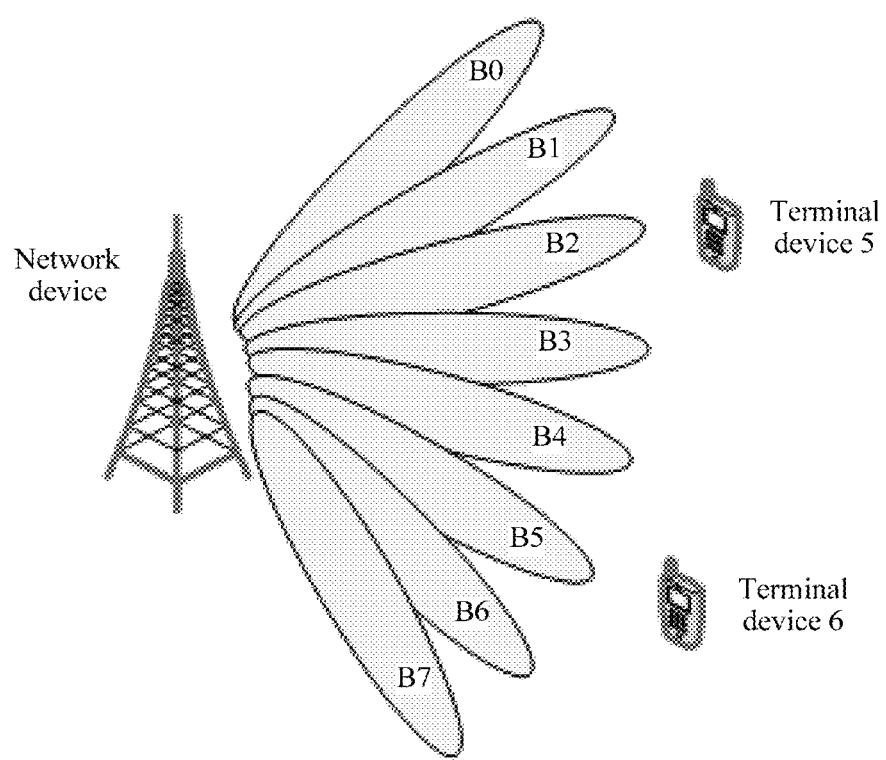
FIG. 3 is another schematic diagram of beam coverage.
Figure 6:
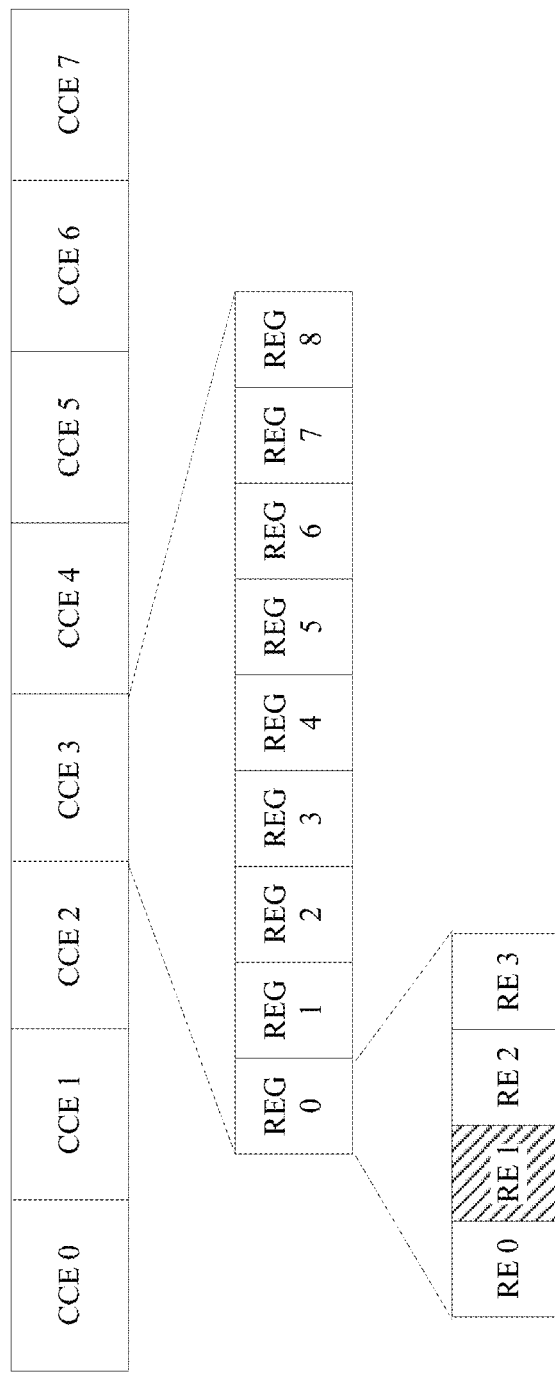
FIG. 6 is a schematic diagram of resource distribution according to another embodiment of the present disclosure.

For example, in the LTE system, the preset location may be an $n^{th}$ RE in each REG in each CCE. Herein, n may be 1, 2, 3, or 4. For example, as shown in FIG. 6, the first time-frequency resource includes eight CCEs, and the third time-frequency resource may include a second RE (for example, an RE 1 in a REG 0) in each REG in each CCE. In FIG. 3, for ease of description, a CCE 3 is used as an example to show REs included in the first time-frequency resource. REs at corresponding locations in other CCEs all belong to the third time-frequency resource. This is not shown in FIG. 6.

It should be understood that in FIG. 6, for ease of description, a description is provided in a case in which preset locations in RE sets are the same, to be specific, the preset locations are a second RE in each REG. However, in this embodiment of the present disclosure, preset locations in different RE sets may be the same or may be different. This is not limited in this embodiment of the present disclosure.

Alternatively, the third time-frequency resource may include all REs in at least one of the foregoing plurality of RE sets.

For example, the third time-frequency resource may include only all REs in one RE set, or may include all REs in the plurality of RE sets.

For example, when the first time-frequency resource includes a plurality of CCEs, the third time-frequency resource may include all REs in at least one of the plurality of CCEs.

It should be understood that the third time-frequency resource may include all the REs in the at least one of the plurality of CCEs provided that the third time-frequency resource is less than the first time-frequency resource; and the resource other than the third time-frequency resource in the first time-frequency resource is the second time-frequency resource. Similarly, in this embodiment of the present disclosure, the second resource also needs to be less than the first time-frequency resource, and a resource other than the second time-frequency resource in the first time-frequency resource is the third time-frequency resource.

Figure 7:
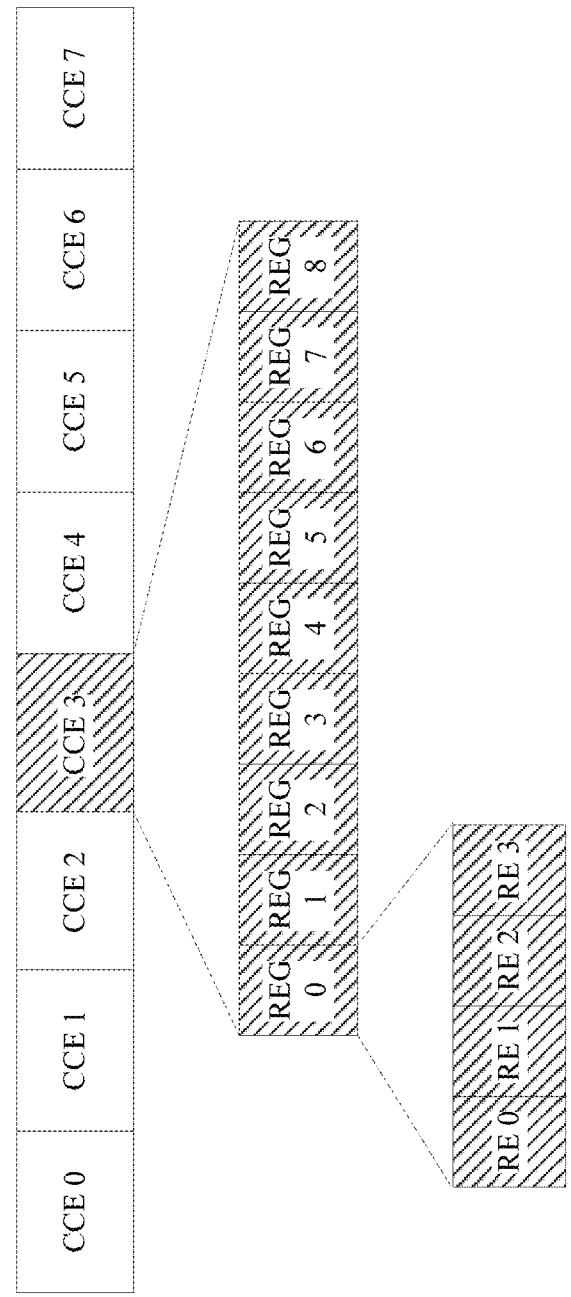
FIG. 7 is a schematic diagram of resource distribution according to another embodiment of the present disclosure.

For example, as shown in FIG. 7, the first time-frequency resource includes eight CCEs, and the third time-frequency resource may include one CCE, for example, all REs in the CCE 3.

It should be understood that the preset rule may be a rule on which the network device and the terminal device preagree. After the first resource is determined, the network device and the terminal device may obtain the second resource and the third resource based on the preset rule. Alternatively, the preset rule may be notified by the network device to the terminal device by using signaling. To be specific, the network device sends a message in advance to agree on the preset rule with the terminal device.

Correspondingly, in another embodiment, before 410, the method may further include: sending an indication message to the terminal device, where the indication message indicates the predefined location.

For example, the indication message may be an RRC signaling message. This embodiment of the present disclosure is not limited thereto.

430. Send a beamformed control channel and a reference signal of the beamformed control channel.

Specifically, the network device respectively transmits, to the terminal device by using the second time-frequency resource and the third time-frequency resource, the beamformed control channel and the reference signal RS corresponding to the beamformed control channel.

Therefore, the terminal device may demodulate the beamformed control channel based on the received reference signal of the beamformed control channel. For example, the terminal device receives a signal on a candidate resource in the candidate resource set in searching space. When blind detection is performed on a candidate resource, for example, the candidate resource may be the first time-frequency resource. The terminal device demodulates, based on the reference signal on the third time-frequency resource at the predefined location, the control channel carried in the second time-frequency resource; decodes information bits of the received control channel; performs CRC check based on an ID of the terminal device; and if the check succeeds, it indicates that the control channel that is sent to the terminal device is successively received, in other words, the blindly detected candidate resource is the first time-frequency resource. If the check fails, it indicates that a base station does not send the control channel on the candidate resource to the terminal device, in other words, the blindly detected candidate resource is not the first time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

The foregoing describes in detail the signal sending method according to the embodiments of the present disclosure with reference to FIG. 4 to FIG. 7. The following describes in detail a signal sending method according to another embodiment of the present disclosure with reference to FIG. 8.

Figure 8:
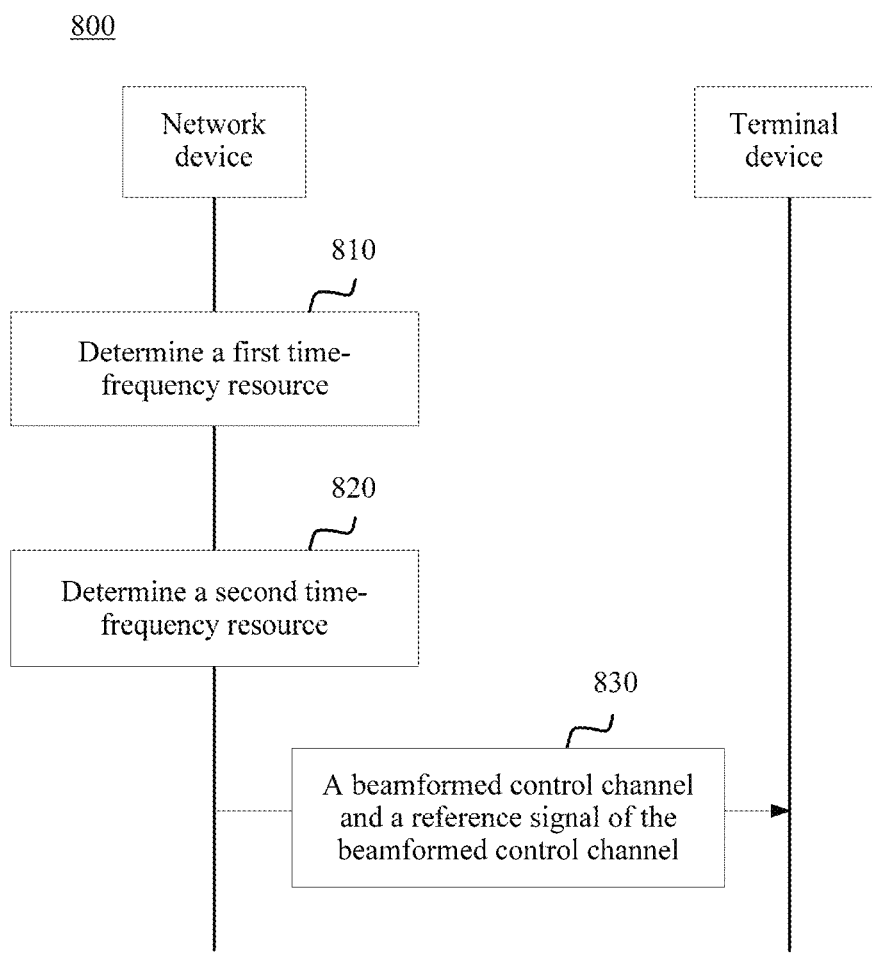
FIG. 8 is a schematic flowchart of a signal transmission method according to another embodiment of the present disclosure.

It should be understood that a difference between FIG. 7 and FIG. 8 is that a first time-frequency resource in FIG. 7 is used to transmit both a beamformed control channel and a reference signal of the beamformed control channel, but a first time-frequency resource in FIG. 8 is used to carry only a beamformed control channel, and the beamformed control channel may be carried in another resource, for example, a candidate resource in a candidate resource set or a resource used to carry another channel or a reference signal. Specifically, the following describes the signal sending method in detail with reference to FIG. 8.

FIG. 8 is a schematic flowchart of a signal sending method according to an embodiment of the present disclosure. The method shown in FIG. 8 may be applied to the foregoing various communications systems. In FIG. 8, a detailed description is provided by using only an example in which a control channel is a PDCCH in an LTE system. However, this embodiment of the present disclosure is not limited thereto. In other words, various terms in this embodiment of the present disclosure may have different names in different systems. This is not limited in this embodiment of the present disclosure. A communications system in this embodiment of the present disclosure includes a network device and a terminal device. A method 800 shown in FIG. 8 includes the following steps.

810. The network device determines a first time-frequency resource.

Specifically, the network device determines the first time-frequency resource. The first time-frequency resource is a first candidate resource in a plurality of candidate resources, and the first time-frequency resource is used to carry a beamformed control channel.

In other words, the first time-frequency resource is a candidate resource in a set of the plurality of candidate resources.

For example, the network device may determine the first time-frequency resource based on an existing method for determining a PDCCH resource in LTE.

Specifically, the network device may first determine an aggregation level. The aggregation level is used to indicate a size of the candidate resource. For example, the network device may first determine a PDCCH format. A PDCCH format corresponds to a specific aggregation level, the aggregation level corresponds to a quantity of CCEs carrying a PDCCH, and the quantity of CCEs corresponds to a size of a candidate resource in the PDCCH format.

Then, the candidate resource is selected from a set of a plurality of candidate resources corresponding to the aggregation level, and the candidate resource is used as the first time-frequency resource.

It should be understood that the aggregation level may include 4 and 8; 1, 2, 4, and 8; or the like. For detailed description of the aggregation level, refer to a definition in an existing standard. Details are not described herein.

It should be understood that the first time-frequency resource may include a plurality of (a quantity corresponds to an aggregation level) resource element RE sets, and each of the plurality of RE sets includes a same fixed quantity of REs.

For example, in LTE, an RE set is a control channel element CCE, a PDCCH is carried by at least one CCE, and a quantity of CCEs carrying the PDCCH is determined by an aggregation level. For example, a quantity of CCEs may be 1, 2, 4, or 8. One CCE includes nine resource element groups (REGs), and one REG includes four REs. In other words, one RE set may include 36 REs. Only LTE is used as an example herein for description. In different systems, one RE set may include another quantity of REs. This embodiment of the present disclosure is not limited thereto.

In the LTE system, the first time-frequency resource may be obtained through respectively aggregating one control channel element CCE, two consecutive CCEs, four consecutive CCEs, or eight consecutive CCEs in first three orthogonal frequency division multiplexing OFDM symbols in a subframe for an aggregation level 1, 2, 4, or 8. For example, as shown in FIG. 5, the first time-frequency resource includes eight CCEs, respectively CCE 0 to CCE 7.

In other words, the candidate resource set herein may correspond to an existing resource set carrying an existing PDCCH.

In this embodiment of the present disclosure, the first time-frequency resource may be used to carry a beamformed PDCCH.

It should be understood that the plurality of candidate resources in this embodiment of the present disclosure may include candidate resources corresponding to all aggregation levels, or may include candidate resources corresponding to one aggregation level. This is not limited in this embodiment of the present disclosure.

It should be understood that the foregoing describes a process of determining the first time-frequency resource based on the existing method for determining a PDCCH resource in LTE, and describes an example in which the first time-frequency resource may include a plurality of CCEs. In this embodiment of the present disclosure, alternatively, the first time-frequency resource may be the first time-frequency resource that is determined by the network device based on an existing method for determining an EPDCCH resource in LTE. The EPDCCH is carried by at least one ECCE. A quantity of ECCEs carrying the EPDCCH is determined based on an EPDCCH format. Each EPDCCH format corresponds to a specific aggregation level, and the aggregation level corresponds to a specific quantity of ECCEs. An EPDCCH candidate resource set may correspond to a resource set that includes a specific quantity of ECCEs corresponding to an EPDCCH format. Each ECCE may include four or eight EREGs. The aggregation level corresponding to the EPDCCH format includes 1, 2, 4, 8, 16, and 32. In other words, a corresponding first time-frequency resource may include 1, 2, 4, 8, 16, and 32 ECCEs.

Therefore, in this embodiment of the present disclosure, based on the existing method, the first resource is determined for carrying a beamformed control channel subsequently. Because this is the same as an existing manner, sending a beamformed control channel in this embodiment of the present disclosure has no impact on or has slight impact on compatibility of a conventional terminal device.

820. The network device determines a second time-frequency resource.

Specifically, the second time-frequency resource is a second candidate resource in the plurality of candidate resources, or the second time-frequency resource is a resource other than the plurality of candidate resources configured for the terminal device, and the second time-frequency resource is used to carry a reference signal of the beamformed control channel.

In other words, the second time-frequency resource may be a resource other than the first time-frequency resource and a third time-frequency resource, and the third time-frequency resource includes a time-frequency resource corresponding to a reference signal of another control channel other than the beamformed control channel. A beam of the another control channel is different from a beam of the beamformed control channel.

The following separately describes in detail a case in which the second time-frequency resource is the second candidate resource and a case in which the second time-frequency resource is the resource other than the plurality of candidate resources configured for the terminal device.

When the second time-frequency resource is the second candidate resource in the plurality of candidate resources,
 the second time-frequency resource may be the second candidate resource predefined in the plurality of candidate resources.

In other words, the second time-frequency resource is a predefined resource, and the predefined resource is one of the plurality of candidate resources, namely, the second candidate resource.

In other words, the second resource is a predefined resource, to be specific, a resource predefined in the system or a resource on which the network device and the terminal device preagree. Both the network device and the terminal device learn of a location of the second resource in advance, and the second resource carries the reference signal of the beamformed control channel.

It should be understood that the second time-frequency resource and the first time-frequency resource may have a same size (for example, a same aggregation level) or may have different sizes. This is not limited in this embodiment of the present disclosure.

For example, the second time-frequency resource and the first time-frequency resource may have a same size (for example, a same aggregation level). In other words, the second time-frequency resource is a candidate resource other than the first time-frequency resource in the set of the plurality of candidate resources corresponding to the first time-frequency resource. For example, in the LTE system, each of aggregation levels of the first time-frequency resource and the second time-frequency resource is 1, 2, 4, 8, or the like.

For another example, a size of the second time-frequency resource is different from a size of the second time-frequency resource. In other words, the second time-frequency resource is a candidate resource in another set of candidate resources. For example, in the LTE system, an aggregation level of the first time-frequency resource is 2, and an aggregation level of the second candidate resource is 4 or the like.

In addition, when the second time-frequency resource is the second candidate resource in the plurality of candidate resources,
 the second time-frequency resource is the second candidate resource configured for the terminal device.

For example, the network device may send, to the terminal device, a message that is used to configure the second resource as the second candidate resource. For example, the message may be an RRC signaling message. However, this embodiment of the present disclosure is not limited thereto.

In addition, when the second time-frequency resource is the second candidate resource in the plurality of candidate resources,
 the network device may determine the second candidate time-frequency resource based on a preset mapping relationship between the first time-frequency resource and the second time-frequency resource.

In a case, the second candidate time-frequency resource may be one of candidate resources that have a same size as the first time-frequency resource and that are in the plurality of candidate resources.

For example, the network device may determine the second time-frequency resource based on the preset mapping relationship between the first time-frequency resource and the second time-frequency resource. The second time-frequency resource is another candidate resource other than the first time-frequency resource in the candidate resources that have a same size.

For example, the mapping relationship indicates that the second time-frequency resource may be a candidate resource adjacent to the first time-frequency resource, a time-frequency resource at a fixed distance from the first time-frequency resource, or the like.

Figure 9:
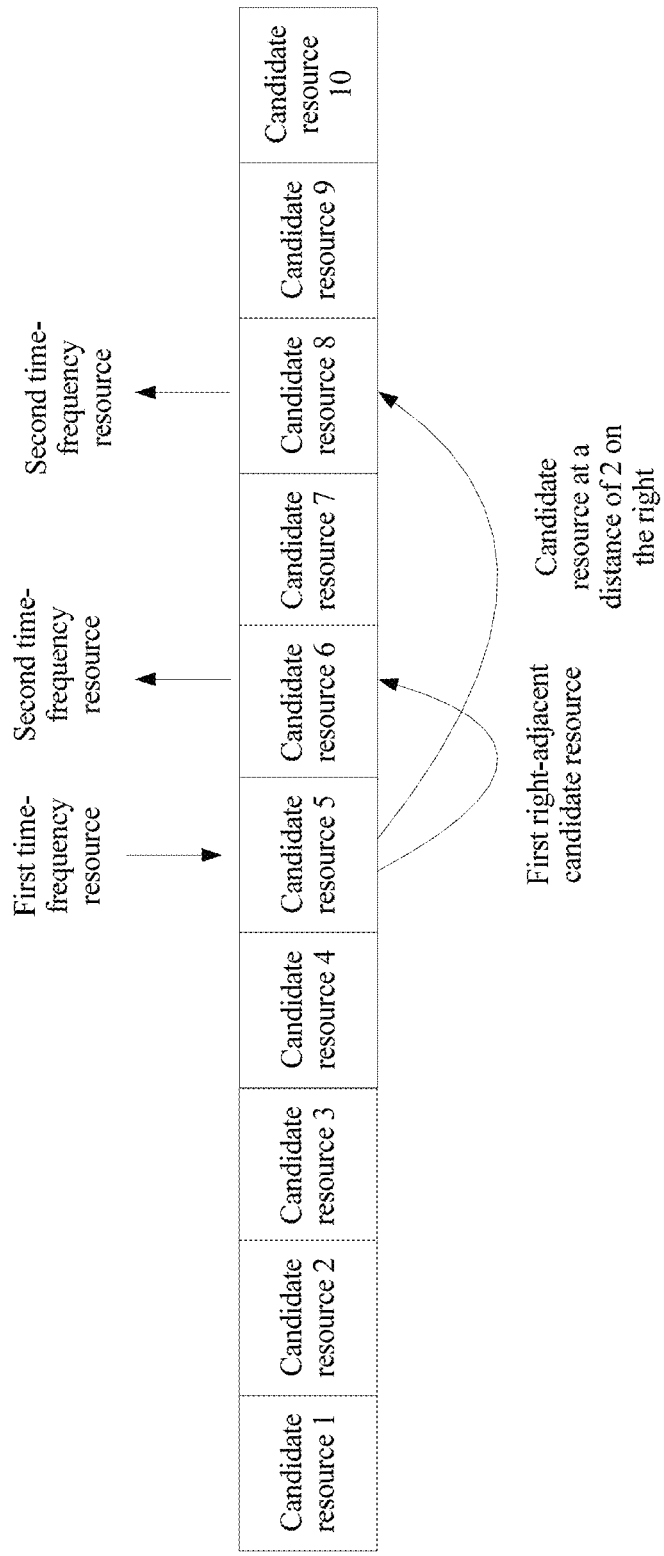
FIG. 9 is a schematic diagram of resource distribution according to another embodiment of the present disclosure.

For example, as shown in FIG. 9, the candidate resource set includes 10 candidate resources, respectively a candidate resource 1 to a candidate resource 10. If the mapping relationship indicates that the second time-frequency resource may be a first right-adjacent candidate resource of the first time-frequency resource, the second time-frequency resource is a candidate resource 6 when the first time-frequency resource is a candidate resource 5.

For another example, if the mapping relationship indicates that the second time-frequency resource may be a candidate resource at a distance of 2 to the first time-frequency resource on the right, the second time-frequency resource is a candidate resource 8 at a distance of 2 to a candidate resource 5 on the right when the first time-frequency resource is the candidate resource 5.

It should be noted that different candidate resources may overlap in actual application, there may be a distance between adjacent candidate resources, and FIG. 9 describes only an example of candidate resources for ease of description. However, this is not limited in this embodiment of the present disclosure.

It should be understood that the mapping relationship may be preagreed on by the network device and the terminal device, for example, may be sent by the network device to the terminal device in advance. This is not limited in this embodiment of the present disclosure.

In another case, the second candidate time-frequency resource is a candidate resource that is in candidate resources of a specified size in the plurality of candidate resources and that does not overlap with the first time-frequency resource.

For example, the specified size may be an aggregation level 1, 2, 4, 8, or the like. The specified size may be the same as or different from the size of the first time-frequency resource. This is not limited in this embodiment of the present disclosure.

For example, the specified size may be an aggregation level 4, and the second time-frequency resource may be a candidate resource that is in a plurality of candidate resources whose aggregation levels are 4 and that has a smallest or a largest number in candidate resources that do not overlap with the first time-frequency resource. This embodiment of the present disclosure is not limited thereto. However, it should be understood that the network device and the terminal device need to have a consistent rule for determining the second time-frequency resource. For example, both the network device and the terminal device agree that the second time-frequency resource is a candidate resource that has a smallest number in a set of a plurality of candidate resources of a specified size and that does not overlap with the first time-frequency resource.

When the second time-frequency resource is the resource other than the plurality of candidate resources configured for the terminal device, the second time-frequency resource includes a resource other than the first time-frequency resource configured by the network device for the terminal device.

For example, the second time-frequency resource includes a time-frequency resource corresponding to another reference signal other than a common reference signal (CRS), or the second time-frequency resource includes a time-frequency resource corresponding to a data channel.

Specifically, the network device may send an indication message for configuration to the terminal device. The indication message indicates a location of the second time-frequency resource. For example, the indication message may be an RRC signaling message. However, this embodiment of the present disclosure is not limited thereto.

For example, in LTE, the second time-frequency resource may be a time-frequency resource in a fourth to a $14^{th}$ OFDM symbols in a subframe.

For example, the second time-frequency resource may include a resource that corresponds to a PDSCH and that is in the fourth to the $14^{th}$ OFDM symbols in the subframe.

Specifically, the second time-frequency resource may include at least one RE in a zero-power user status information-reference signal zero-power CSI-RS resource configured for the user equipment.

Alternatively, the third time-frequency resource may include at least one RE that is in the fourth to the $14^{th}$ OFDM symbols in the subframe and that is in a non-zero power user status information-reference signal non-zero power CSI-RS resource configured for the user equipment.

Therefore, in this embodiment of the present disclosure, the existing first time-frequency resource carrying a control channel carries the beamformed control channel, and another resource (the second time-frequency resource) carries the reference signal of the beamformed control channel, to send the beamformed control channel and the reference signal of the beamformed control channel. In this way, it becomes possible to improve coverage of a control channel through beamforming in the existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

830. Send a beamformed control channel and a reference signal of the beamformed control channel.

Specifically, the network device respectively transmits, to the terminal device by using the first time-frequency resource and the second time-frequency resource, the beamformed control channel and the reference signal RS corresponding to the beamformed control channel.

Therefore, the terminal device may demodulate the beamformed control channel based on the received reference signal of the beamformed control channel. For example, the terminal device receives a signal on a candidate resource in the candidate resource set in searching space. When blind detection is performed on a candidate resource, for example, the candidate resource may be the first time-frequency resource.

The terminal device detects the second time-frequency resource. The terminal device may determine the reference signal on the second time-frequency resource in one of the foregoing four manners. The terminal device demodulates, based on the reference signal on the second time-frequency resource, the control channel carried in the first time-frequency resource; decodes information bits of the received control channel; performs CRC check based on an ID of the terminal device; and if the check succeeds, it indicates that the control channel that is sent to the terminal device is successively received, in other words, the blindly detected candidate resource is the first time-frequency resource. If the check fails, it indicates that a base station does not send the control channel on the candidate resource to the terminal device, in other words, the blindly detected candidate resource is not the first time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

The foregoing describes in detail the signal sending method according to the embodiments of the present disclosure with reference to FIG. 4 to FIG. 9. The following describes a device configured for signal phase synchronization in a communications system according to embodiments of the present disclosure with reference to FIG. 10 to FIG. 17.

Figure 10:
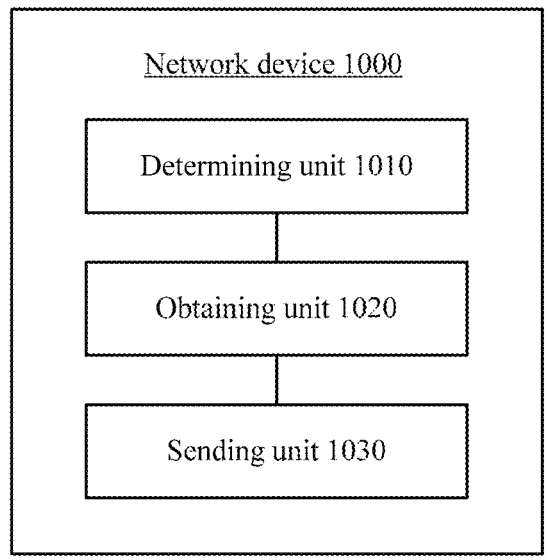
FIG. 10 is a schematic block diagram of a network device according to an embodiment of the present disclosure.

FIG. 10 is a schematic block diagram of a network device 1000 for transmitting a signal according to an embodiment of the present disclosure. As shown in FIG. 10, the network device 1000 includes:

a determining unit 1010, configured to determine a first time-frequency resource, where the first time-frequency resource is a first candidate resource in a plurality of candidate resources;

an obtaining unit 1020, configured to obtain a second time-frequency resource and a third time-frequency resource based on the first time-frequency resource and a preset rule, where the third time-frequency resource includes at least one resource element RE at a predefined location in the first time-frequency resource, the second time-frequency resource includes a resource other than the third time-frequency resource in the first time-frequency resource, the preset rule indicates the predefined location, the second time-frequency resource is used to carry a beamformed control channel, and the third time-frequency resource is used to carry a reference signal of the beamformed control channel; and a sending unit 1030, configured to respectively transmit the beamformed control channel and the reference signal of the beamformed control channel to a terminal device by using the second time-frequency resource and the third time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

Optionally, the first time-frequency resource includes a plurality of resource element RE sets, each of the plurality of RE sets includes a same fixed quantity of REs, and the third time-frequency resource includes an RE at a preset location in each of the plurality of RE sets.

Optionally, the first time-frequency resource includes a plurality of resource element RE sets, each of the plurality of RE sets includes a same fixed quantity of REs, and the third time-frequency resource includes all REs in at least one of the plurality of RE sets.

Optionally, the sending unit is further configured to: before the determining unit determines the first time-frequency resource, send an indication message to the terminal device. The indication message indicates the preset rule.

Optionally, the determining unit is specifically configured to:

determine an aggregation level, where the aggregation level is used to indicate a size of the candidate resource; and select one candidate resource from a set of the plurality of candidate resources corresponding to the aggregation level, and use the candidate resource as the first time-frequency resource.

It should be understood that the network device 1000 shown in FIG. 10 can implement processes related to the network device in the embodiment of FIG. 4. Operations and/or functions of modules of the network device 1000 are respectively used for implementing corresponding processes in the method embodiment of FIG. 4. For details, refer to the description of the method embodiment. To avoid repetition, detailed description is properly omitted herein.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

Figure 11:
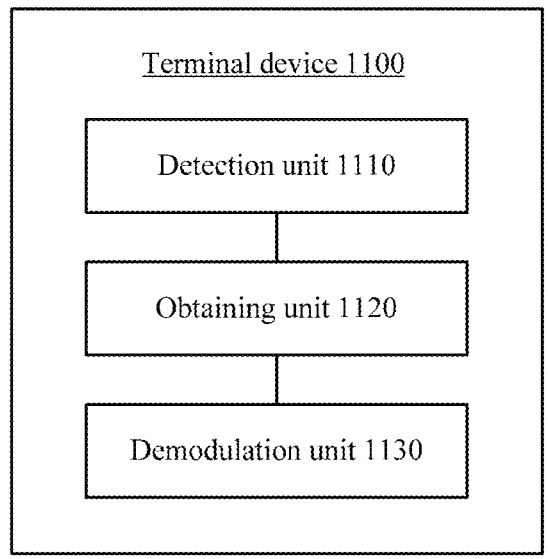
FIG. 11 is a schematic block diagram of a terminal device according to an embodiment of the present disclosure.

FIG. 11 is a schematic block diagram of a terminal device 1100 for transmitting a signal according to an embodiment of the present disclosure. As shown in FIG. 11, the terminal device 1100 includes:

a detection unit 1110, configured to detect a first time-frequency resource, where the first time-frequency resource is a first candidate resource in a plurality of candidate resources;

an obtaining unit 1120, configured to obtain a second time-frequency resource and a third time-frequency resource based on the first time-frequency resource and a preset rule, where the third time-frequency resource includes at least one resource element RE at a predefined location in the first time-frequency resource, the second time-frequency resource includes a resource other than the third time-frequency resource in the first time-frequency resource, the preset rule indicates the predefined location, the second time-frequency resource is used to carry a beamformed control channel, and the third time-frequency resource is used to carry a reference signal of the beamformed control channel; and a demodulation unit 1130, configured to demodulate, based on the reference signal that is of the beamformed control channel and that is carried in the third time-frequency resource, the beamformed control channel carried in the second time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

Optionally, the first time-frequency resource includes a plurality of resource element RE sets, each of the plurality of RE sets includes a same fixed quantity of REs, and the third time-frequency resource includes an RE at a preset location in each of the plurality of RE sets.

Optionally, the first time-frequency resource includes a plurality of resource element RE sets, each of the plurality of RE sets includes a same fixed quantity of REs, and the third time-frequency resource includes all REs in at least one of the plurality of RE sets.

Optionally, the terminal device may further include:
a receiving unit, configured to: before the detection unit detects the first time-frequency resource, receive an indication message, where the indication message indicates the preset rule.

It should be understood that the terminal device 1100 shown in FIG. 11 can implement processes related to the terminal device in the embodiment of FIG. 4. Operations and/or functions of modules of the terminal device 1100 are respectively used for implementing corresponding processes in the method embodiment of FIG. 4. For details, refer to the description of the method embodiment. To avoid repetition, detailed description is properly omitted herein.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

Figure 12:
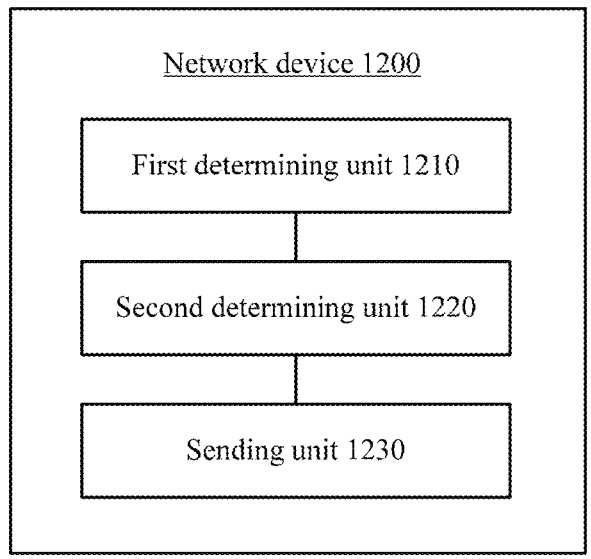
FIG. 12 is a schematic block diagram of a network device according to another embodiment of the present disclosure.

FIG. 12 is a schematic block diagram of a network device 1200 for transmitting a signal according to an embodiment of the present disclosure. As shown in FIG. 12, the network device 1200 includes:
a first determining unit 1210, configured to determine a first time-frequency resource, where the first time-frequency resource is a first candidate resource in a plurality of candidate resources, and the first time-frequency resource is used to carry a beamformed control channel;
a second determining unit 1220, configured to determine a second time-frequency resource, where the second time-frequency resource is a second candidate resource in the plurality of candidate resources, or the second time-frequency resource is a resource other than the plurality of candidate resources configured for a terminal device, a third time-frequency resource includes a time-frequency resource corresponding to a reference signal of another control channel other than the beamformed control channel, and the second time-frequency resource is used to carry a reference signal of the beamformed control channel; and
a sending unit 1230, configured to respectively transmit the beamformed control channel and the reference signal of the beamformed control channel to the terminal device by using the first time-frequency resource and the second time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

Optionally, when the second time-frequency resource is the second candidate resource in the plurality of candidate resources,
the second time-frequency resource is the second candidate resource predefined in the plurality of candidate resources.

Optionally, when the second time-frequency resource is the second candidate resource in the plurality of candidate resources,
the second time-frequency resource is the second candidate resource configured for the terminal device.

Optionally, when the second time-frequency resource is the resource other than the plurality of candidate resources configured for the terminal device,
the second time-frequency resource includes a time-frequency resource corresponding to another reference signal other than a common reference signal (CRS), or the second time-frequency resource includes a time-frequency resource corresponding to a data channel.

Optionally, the sending unit is further configured to: before the second determining unit determines the second time-frequency resource, send an indication message to the terminal device. The indication message indicates a location of the second time-frequency resource.

Optionally, when the second time-frequency resource is the second candidate resource in the plurality of candidate resources, the second determining unit is specifically configured to:
determine the second candidate time-frequency resource based on a preset mapping relationship between the first time-frequency resource and the second time-frequency resource.

Optionally, the second candidate time-frequency resource is one of candidate resources that have a same size as the first time-frequency resource and that are in the plurality of candidate resources.

Optionally, the second candidate time-frequency resource is a candidate resource that is in candidate resources of a specified size in the plurality of candidate resources and that does not overlap with the first time-frequency resource.

Optionally, the first determining unit is specifically configured to:
determine an aggregation level, where the aggregation level is used to indicate a size of the candidate resource; and
select one candidate resource from a set of the plurality of candidate resources corresponding to the aggregation level, and use the candidate resource as the first time-frequency resource.

It should be understood that the network device 1200 shown in FIG. 12 can implement processes related to the network device in the embodiment of FIG. 8. Operations and/or functions of modules of the network device 1200 are respectively used for implementing corresponding processes in the method embodiment of FIG. 8. For details, refer to the description of the method embodiment. To avoid repetition, detailed description is properly omitted herein.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

Figure 13:
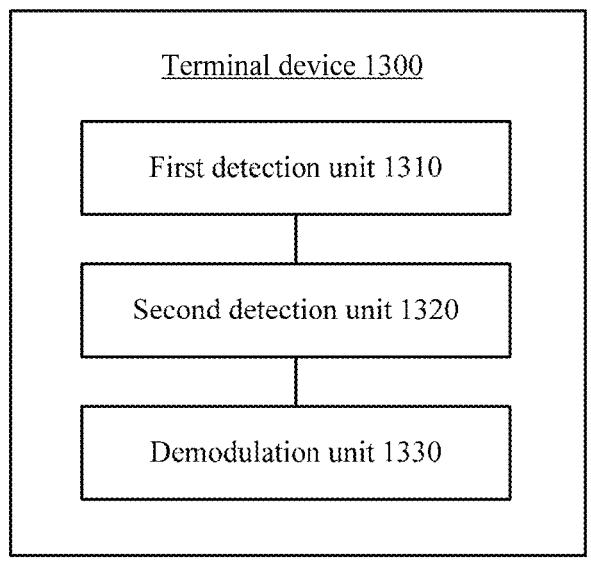
FIG. 13 is a schematic block diagram of a terminal device according to another embodiment of the present disclosure.

FIG. 13 is a schematic block diagram of a terminal device 1300 for transmitting a signal according to an embodiment of the present disclosure. As shown in FIG. 13, the terminal device 1300 includes:
a first detection unit 1310, configured to detect a first time-frequency resource, where the first time-frequency resource is a first candidate resource in a plurality of candidate resources, and the first time-frequency resource is used to carry a beamformed control channel;
a second detection unit 1320, configured to detect a second time-frequency resource, where the second time-frequency resource is a second candidate resource in the plurality of candidate resources, or the second time-frequency resource is a resource other than the plurality of candidate resources configured for the terminal device, and the second time-frequency resource is used to carry a reference signal of the beamformed control channel; and
a demodulation unit 1330, configured to demodulate, based on the reference signal that is of the beamformed control channel and that is carried in the second time-frequency resource, the beamformed control channel carried in the first time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

Optionally, when the second time-frequency resource is the second candidate resource in the plurality of candidate resources,
the second time-frequency resource is the second candidate resource predefined in the plurality of candidate resources.

Optionally, when the second time-frequency resource is the second candidate resource in the plurality of candidate resources,
the second time-frequency resource is the second candidate resource configured for the terminal device.

Optionally, when the second time-frequency resource is the resource other than the plurality of candidate resources configured for the terminal device,
the second time-frequency resource includes a time-frequency resource corresponding to another reference signal other than a common reference signal (CRS), or the second time-frequency resource includes a time-frequency resource corresponding to a data channel.

Optionally, the terminal device further includes:
a receiving unit, configured to: before the second detection unit detects the second time-frequency resource, receive an indication message sent by the network device, where the indication message indicates a location of the second time-frequency resource.

Optionally, when the second time-frequency resource is the second candidate resource in the plurality of candidate resources,
the second time-frequency resource is the second candidate resource determined based on a preset mapping relationship between the first time-frequency resource and the second time-frequency resource.

Optionally, the second candidate time-frequency resource is one of candidate resources that have a same size as the first time-frequency resource and that are in the plurality of candidate resources.

Optionally, the second candidate time-frequency resource is a candidate resource that is in candidate resources of a specified size in the plurality of candidate resources and that does not overlap with the first time-frequency resource.

It should be understood that the terminal device 1300 shown in FIG. 13 can implement processes related to the terminal device in the embodiment of FIG. 8. Operations and/or functions of modules of the terminal device 1300 are respectively used for implementing corresponding processes in the method embodiment of FIG. 8. For details, refer to the description of the method embodiment. To avoid repetition, detailed description is properly omitted herein.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

Figure 14:
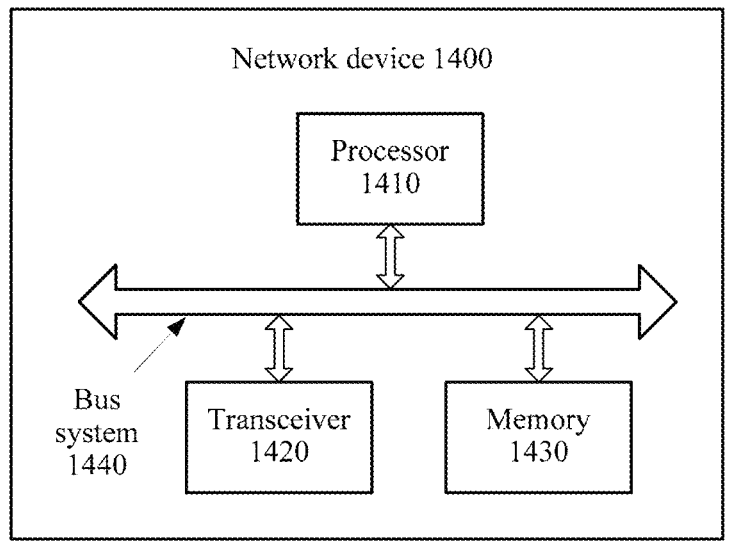
FIG. 14 is a schematic block diagram of a network device according to another embodiment of the present disclosure.

FIG. 14 is a schematic block diagram of a network device 1400 for transmitting a signal according to an embodiment of the present disclosure. As shown in FIG. 14, the network device 1400 includes a processor 1410 and a transceiver 1420. The processor 1410 is connected to the transceiver 1420. Optionally, the network device 1400 further includes a memory 1430. The memory 1430 is connected to the processor 1410. Optionally, the apparatus 1400 further includes a bus system 1440. The processor 1410, the memory 1430, and the transceiver 1420 may be connected by using the bus system 1440. The memory 1430 may be configured to store an instruction. The processor 1410 is configured to execute the instruction stored in the memory 1430, to control the transceiver 1420 to send information or a signal.

The processor 1410 is configured to: determine a first time-frequency resource, where the first time-frequency resource is a first candidate resource in a plurality of candidate resources; and
obtain a second time-frequency resource and a third time-frequency resource based on the first time-frequency resource and a preset rule, where the third time-frequency resource includes at least one resource element RE at a predefined location in the first time-frequency resource, the second time-frequency resource includes a resource other than the third time-frequency resource in the first time-frequency resource, the preset rule indicates the predefined location, the second time-frequency resource is used to carry a beamformed control channel, and the third time-frequency resource is used to carry a reference signal of the beamformed control channel.

The transceiver 1420 is configured to respectively transmit the beamformed control channel and the reference signal of the beamformed control channel to a terminal device by using the second time-frequency resource and the third time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

It should be understood that in this embodiment of the present disclosure, the processor 1410 may be a central processing unit (CPU), or the processor 1410 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 1430 may include a read-only memory and a random access memory, and provides an instruction and data for the processor 1410. A part of the memory 1430 may further include a nonvolatile random access memory. For example, the memory 1430 may further store information about a device type.

In addition to a data bus, the bus system 1440 may further include a power bus, a control bus, a status signal bus, and the like. However, for clarity of description, various buses are marked as the bus system 1440 in the figure.

In an implementation process, the steps of the foregoing method may be completed by using a hardware integrated logic circuit or an instruction in a software form in the processor 1410. The steps of the method disclosed with reference to the embodiments of the present disclosure may be directly implemented by using a hardware processor, or may be implemented by using a combination of a hardware module and a software module in the processor. The software module may be located in a mature storage medium in the art such as a random memory, a flash memory, a read-only memory, a programmable read-only memory, an electrically erasable programmable memory, or a register. The storage medium is located in the memory 1430. The processor 1410 reads information from the memory 1430, and completes the steps of the foregoing method in combination with hardware of the processor 1410. To avoid repetition, details are not described herein.

Optionally, the first time-frequency resource includes a plurality of resource element RE sets, each of the plurality of RE sets includes a same fixed quantity of REs, and the third time-frequency resource includes an RE at a preset location in each of the plurality of RE sets.

Optionally, the first time-frequency resource includes a plurality of resource element RE sets, each of the plurality of RE sets includes a same fixed quantity of REs, and the third time-frequency resource includes all REs in at least one of the plurality of RE sets.

Optionally, the sending unit is further configured to: before the determining unit determines the first time-frequency resource, send an indication message to the terminal device. The indication message indicates the preset rule.

Optionally, the processor 1410 is specifically configured to:
  determine an aggregation level, where the aggregation level is used to indicate a size of the candidate resource; and
  select one candidate resource from a set of the plurality of candidate resources corresponding to the aggregation level, and use the candidate resource as the first time-frequency resource.

It should be understood that the network device 1400 shown in FIG. 14 can implement processes related to the network device in the embodiment of FIG. 4. Operations and/or functions of modules of the network device 1400 are respectively used for implementing corresponding processes in the method embodiment of FIG. 4. For details, refer to the description of the method embodiment. To avoid repetition, detailed description is properly omitted herein.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

Figure 15:
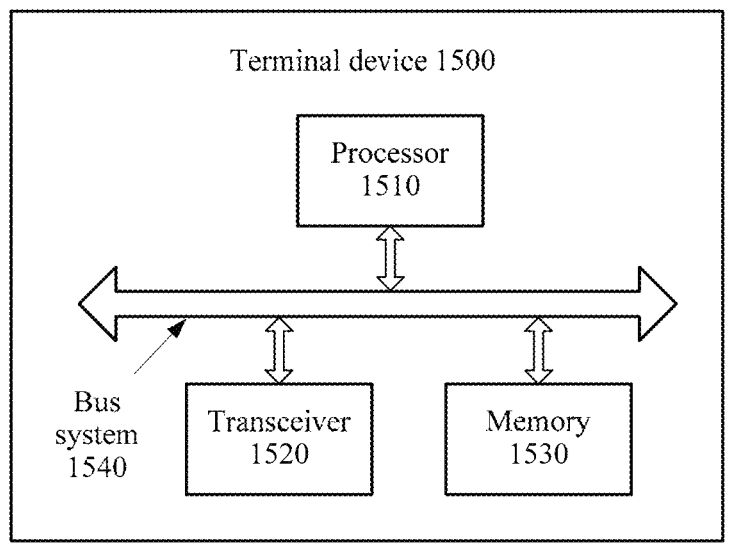
FIG. 15 is a schematic block diagram of a terminal device according to another embodiment of the present disclosure.

FIG. 15 is a schematic block diagram of a network device 1500 for transmitting a signal according to an embodiment of the present disclosure. As shown in FIG. 15, the network device 1500 includes a processor 1510 and a transceiver 1520. The processor 1510 is connected to the transceiver 1520. Optionally, the network device 1500 further includes a memory 1530. The memory 1530 is connected to the processor 1510. Optionally, the apparatus 1500 further includes a bus system 1540. The processor 1510, the memory 1530, and the transceiver 1520 may be connected by using the bus system 1540. The memory 1530 may be configured to store an instruction. The processor 1510 is configured to execute the instruction stored in the memory 1530, to control the transceiver 1520 to send information or a signal.

The processor 1510 is configured to: detect a first time-frequency resource, where the first time-frequency resource is a first candidate resource in a plurality of candidate resources;
  obtain a second time-frequency resource and a third time-frequency resource based on the first time-frequency resource and a preset rule, where the third time-frequency resource includes at least one resource element RE at a predefined location in the first time-frequency resource, the second time-frequency resource includes a resource other than the third time-frequency resource in the first time-frequency resource, the preset rule indicates the predefined location, the second time-frequency resource is used to carry a beamformed control channel, and the third time-frequency resource is used to carry a reference signal of the beamformed control channel; and
  demodulate, based on the reference signal that is of the beamformed control channel and that is carried in the third time-frequency resource, the beamformed control channel carried in the second time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

It should be understood that in this embodiment of the present disclosure, the processor 1510 may be a central processing unit (CPU), or the processor 1510 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 1530 may include a read-only memory and a random access memory, and provides an instruction and data for the processor 1510. A part of the memory 1530 may further include a nonvolatile random access memory. For example, the memory 1530 may further store information about a device type.

In addition to a data bus, the bus system 1540 may further include a power bus, a control bus, a status signal bus, and the like. However, for clarity of description, various buses are marked as the bus system 1540 in the figure.

In an implementation process, the steps of the foregoing method may be completed by using a hardware integrated logic circuit or an instruction in a software form in the processor 1510. The steps of the method disclosed with reference to the embodiments of the present disclosure may be directly implemented by using a hardware processor, or may be implemented by using a combination of a hardware module and a software module in the processor. The software module may be located in a mature storage medium in the art such as a random memory, a flash memory, a read-only memory, a programmable read-only memory, an electrically erasable programmable memory, or a register. The storage medium is located in the memory 1530. The processor 1510 reads information from the memory 1530, and completes the steps of the foregoing method in combination with hardware of the processor 1510. To avoid repetition, details are not described herein.

Optionally, the first time-frequency resource includes a plurality of resource element RE sets, each of the plurality of RE sets includes a same fixed quantity of REs, and the third time-frequency resource includes an RE at a preset location in each of the plurality of RE sets.

Optionally, the first time-frequency resource includes a plurality of resource element RE sets, each of the plurality of RE sets includes a same fixed quantity of REs, and the third time-frequency resource includes all REs in at least one of the plurality of RE sets.

Optionally, the transceiver 1520 is configured to: before the detection unit detects the first time-frequency resource, receive an indication message. The indication message indicates the preset rule.

It should be understood that the terminal device 1500 shown in FIG. 15 can implement processes related to the terminal device in the embodiment of FIG. 4. Operations and/or functions of modules of the terminal device 1500 are respectively used for implementing corresponding processes in the method embodiment of FIG. 4. For details, refer to the description of the method embodiment. To avoid repetition, detailed description is properly omitted herein.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

Figure 16:
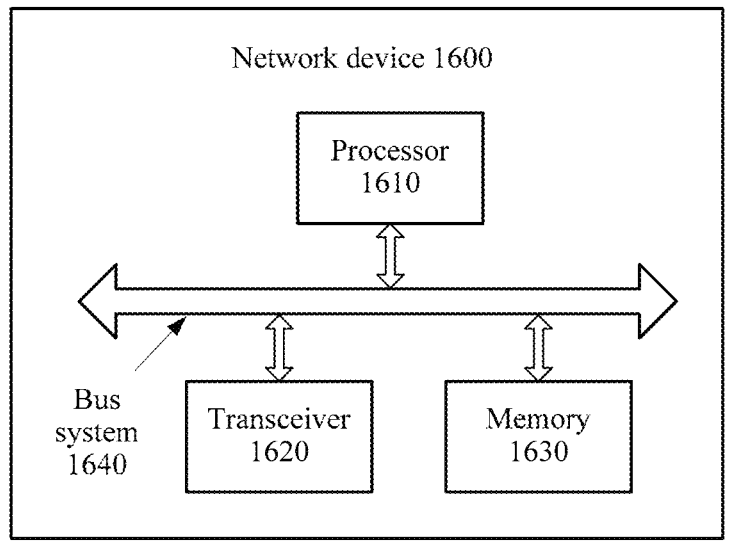
FIG. 16 is a schematic block diagram of a network device according to another embodiment of the present disclosure.

FIG. 16 is a schematic block diagram of a network device 1600 for transmitting a signal according to an embodiment of the present disclosure. As shown in FIG. 16, the network device 1600 includes a processor 1610 and a transceiver 1620. The processor 1610 is connected to the transceiver 1620. Optionally, the network device 1600 further includes a memory 1630. The memory 1630 is connected to the processor 1610. Optionally, the apparatus 1600 further includes a bus system 1640. The processor 1610, the memory 1630, and the transceiver 1620 may be connected by using the bus system 1640. The memory 1630 may be configured to store an instruction. The processor 1610 is configured to execute the instruction stored in the memory 1630, to control the transceiver 1620 to send information or a signal.

The processor 1610 is configured to: determine a first time-frequency resource, where the first time-frequency resource is a first candidate resource in a plurality of candidate resources, and the first time-frequency resource is used to carry a beamformed control channel; and determine a second time-frequency resource, where the second time-frequency resource is a second candidate resource in the plurality of candidate resources, or the second time-frequency resource is a resource other than the plurality of candidate resources configured for a terminal device, and the second time-frequency resource is used to carry a reference signal of the beamformed control channel.

The transceiver 1620 is configured to respectively transmit the beamformed control channel and the reference signal of the beamformed control channel to the terminal device by using the second time-frequency resource and the third time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

It should be understood that in this embodiment of the present disclosure, the processor 1610 may be a central processing unit (CPU), or the processor 1610 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 1630 may include a read-only memory and a random access memory, and provides an instruction and data for the processor 1610. A part of the memory 1630 may further include a nonvolatile random access memory. For example, the memory 1630 may further store information about a device type.

In addition to a data bus, the bus system 1640 may further include a power bus, a control bus, a status signal bus, and the like. However, for clarity of description, various buses are marked as the bus system 1640 in the figure.

In an implementation process, the steps of the foregoing method may be completed by using a hardware integrated logic circuit or an instruction in a software form in the processor 1610. The steps of the method disclosed with reference to the embodiments of the present disclosure may be directly implemented by using a hardware processor, or may be implemented by using a combination of a hardware module and a software module in the processor. The software module may be located in a mature storage medium in the art such as a random memory, a flash memory, a read-only memory, a programmable read-only memory, an electrically erasable programmable memory, or a register. The storage medium is located in the memory 1630. The processor 1610 reads information from the memory 1630, and completes the steps of the foregoing method in combination with hardware of the memory 1630. To avoid repetition, details are not described herein.

Optionally, when the second time-frequency resource is the second candidate resource in the plurality of candidate resources, the second time-frequency resource is the second candidate resource predefined in the plurality of candidate resources.

Optionally, when the second time-frequency resource is the second candidate resource in the plurality of candidate resources, the second time-frequency resource is the second candidate resource configured for the terminal device.

Optionally, when the second time-frequency resource is the resource other than the plurality of candidate resources configured for the terminal device, the second time-frequency resource includes a time-frequency resource corresponding to another reference signal other than a common reference signal (CRS), or the second time-frequency resource includes a time-frequency resource corresponding to a data channel.

Optionally, the sending unit is further configured to: before the second determining unit determines the second time-frequency resource, send an indication message to the terminal device. The indication message indicates a location of the second time-frequency resource.

Optionally, when the second time-frequency resource is the second candidate resource in the plurality of candidate resources, the processor 1610 is specifically configured to:

determine the second candidate time-frequency resource based on a preset mapping relationship between the first time-frequency resource and the second time-frequency resource.

Further, the second candidate time-frequency resource is one of candidate resources that have a same size as the first time-frequency resource and that are in the plurality of candidate resources.

Alternatively, the second candidate time-frequency resource is a candidate resource that is in candidate resources of a specified size in the plurality of candidate resources and that does not overlap with the first time-frequency resource.

Optionally, the processor 1610 is specifically configured to:

determine an aggregation level, where the aggregation level is used to indicate a size of the candidate resource; and select one candidate resource from a set of the plurality of candidate resources corresponding to the aggregation level, and use the candidate resource as the first time-frequency resource.

It should be understood that the network device 1600 shown in FIG. 16 can implement processes related to the network device in the embodiment of FIG. 8. Operations and/or functions of modules of the network device 1600 are respectively used for implementing corresponding processes in the method embodiment of FIG. 8. For details, refer to the description of the method embodiment. To avoid repetition, detailed description is properly omitted herein.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

Figure 17:
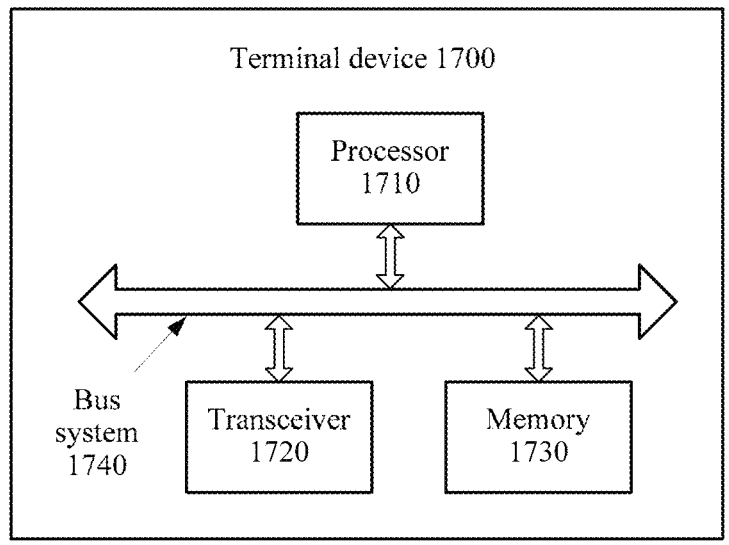
FIG. 17 is a schematic block diagram of a terminal device according to another embodiment of the present disclosure.

FIG. 17 is a schematic block diagram of a network device 1700 for transmitting a signal according to an embodiment of the present disclosure. As shown in FIG. 17, the network device 1700 includes a processor 1710 and a transceiver 1720. The processor 1710 is connected to the transceiver 1720. Optionally, the network device 1700 further includes a memory 1730. The memory 1730 is connected to the processor 1710. Optionally, the apparatus 1700 further includes a bus system 1740. The processor 1710, the memory 1730, and the transceiver 1720 may be connected by using the bus system 1740. The memory 1730 may be configured to store an instruction. The processor 1710 is configured to execute the instruction stored in the memory 1730, to control the transceiver 1720 to send information or a signal.

The processor 1710 is configured to: detect a first time-frequency resource, where the first time-frequency resource is a first candidate resource in a plurality of candidate resources, and the first time-frequency resource is used to carry a beamformed control channel;

detect a second time-frequency resource, where the second time-frequency resource is a second candidate resource in the plurality of candidate resources, or the second time-frequency resource is a resource other than the plurality of candidate resources configured for a terminal device, and the second time-frequency resource is used to carry a reference signal of the beamformed control channel; and demodulate, based on the reference signal that is of the beamformed control channel and that is carried in the second time-frequency resource, the beamformed control channel carried in the first time-frequency resource.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

In addition, a design of the beamformed control channel and the reference signal used for demodulating the beamformed control channel is used in this embodiment of the present disclosure, to improve coverage and performance of the control channel in comparison with a conventional control channel, and especially, to improve coverage of a cell using a high-frequency carrier. In addition, introduction of the beamformed control channel has no impact on or has slight impact on compatibility of a conventional terminal device.

It should be understood that in this embodiment of the present disclosure, the processor 1710 may be a central processing unit (CPU), or the processor 1710 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 1730 may include a read-only memory and a random access memory, and provides an instruction and data for the processor 1710. A part of the memory 1730 may further include a nonvolatile random access memory. For example, the memory 1730 may further store information about a device type.

In addition to a data bus, the bus system 1740 may further include a power bus, a control bus, a status signal bus, and the like. However, for clarity of description, various buses are marked as the bus system 1740 in the figure.

In an implementation process, the steps of the foregoing method may be completed by using a hardware integrated logic circuit or an instruction in a software form in the processor 1710. The steps of the method disclosed with reference to the embodiments of the present disclosure may be directly implemented by using a hardware processor, or may be implemented by using a combination of a hardware module and a software module in the processor. The software module may be located in a mature storage medium in the art such as a random memory, a flash memory, a read-only memory, a programmable read-only memory, an electrically erasable programmable memory, or a register. The storage medium is located in the memory 1730. The processor 1710 reads information from the memory 1730, and completes the steps of the foregoing method in combination with hardware of the memory 1730. To avoid repetition, details are not described herein.

Optionally, when the second time-frequency resource is the second candidate resource in the plurality of candidate resources,
  the second time-frequency resource is the second candidate resource predefined in the plurality of candidate resources.

Optionally, when the second time-frequency resource is the second candidate resource in the plurality of candidate resources,
  the second time-frequency resource is the second candidate resource configured for the terminal device.

Optionally, when the second time-frequency resource is the resource other than the plurality of candidate resources configured for the terminal device,
  the second time-frequency resource includes a time-frequency resource corresponding to another reference signal other than a common reference signal (CRS), or the second time-frequency resource includes a time-frequency resource corresponding to a data channel.

Optionally, the transceiver 1720 is configured to: before the processor 1710 detects the second time-frequency resource, receive an indication message sent by the network device, where the indication message indicates a location of the second time-frequency resource.

Optionally, when the second time-frequency resource is the second candidate resource in the plurality of candidate resources,
  the second time-frequency resource is the second candidate resource determined based on a preset mapping relationship between the first time-frequency resource and the second time-frequency resource.

Further, the second candidate time-frequency resource is one of candidate resources that have a same size as the first time-frequency resource and that are in the plurality of candidate resources.

Alternatively, the second candidate time-frequency resource is a candidate resource that is in candidate resources of a specified size in the plurality of candidate resources and that does not overlap with the first time-frequency resource.

It should be understood that the terminal device 1700 shown in FIG. 17 can implement processes related to the terminal device in the embodiment of FIG. 8. Operations and/or functions of modules of the terminal device 1700 are respectively used for implementing corresponding processes in the method embodiment of FIG. 8. For details, refer to the description of the method embodiment. To avoid repetition, detailed description is properly omitted herein.

Therefore, in this embodiment of the present disclosure, resources carrying the beamformed control channel and the reference signal of the beamformed control channel are determined, to transmit the beamformed control channel and the reference signal of the beamformed control channel. In this way, it becomes possible to improve coverage of a control channel through beamforming in an existing system.

It should be understood that "one embodiment" or "an embodiment" mentioned in the whole specification means that particular features, structures, or characteristics related to the embodiment are included in at least one embodiment of the present disclosure. Therefore, "in one embodiment" or "in an embodiment" appearing throughout this specification may be not necessarily a same embodiment. In addition, these particular features, structures, or characteristics may be combined in one or more embodiments in any appropriate manner. It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

In addition, the terms "system" and "network" are interchangeable in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined based on A. However, it should further be understood that determining B based on A does not mean that B is determined based on A only, to be specific, B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, compositions and steps of each example are generally described above based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communication connections between the apparatuses or units may be electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

From description of the foregoing implementations, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. The following is used as an example but not a limitation: The computer-readable medium may include a RAM, a ROM, an EEPROM, a CD-ROM or another optical disc storage, a disk storage medium or another magnetic storage device, or any other medium that can carry or store expected program code in a form of an instruction or a data structure and that can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. For example, a disk and disc used in the present disclosure includes a compact disc (CD), a laser disc, an optical disc, a digital versatile disc (DVD), a floppy disk, and a Blu-ray disc. The disk generally copies data by using a magnetic means, and the disc copies data optically by using a laser means. The foregoing combination should also be included in the protection scope of the computer-readable medium.

In summary, the foregoing description is merely example embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A communication method, comprising:
   determining a first time-frequency resource, wherein the first time-frequency resource is a physical downlink control channel (PDCCH) candidate in a plurality of PDCCH candidates;
   determining a second time-frequency resource and a third time-frequency resource in the first time-frequency resource, wherein the first time-frequency resource consists of a plurality of resource element (RE) sets, all of the plurality of RE sets comprises a same fixed quantity of REs, and the third time-frequency resource is located at a preset location in each of the plurality of RE sets, wherein each RE set comprises a plurality of RE groups (REGs), wherein the third time-frequency resource includes at least one RE in each REG of the plurality of REGs in each RE set, and the second time-frequency resource comprises a resource other than the third time-frequency resource in the first time-frequency resource, the second time-frequency resource is used to carry a beamformed control channel, and the third time-frequency resource is used to carry a reference signal of the beamformed control channel; and
   transmitting the beamformed control channel and the reference signal of the beamformed control channel to a terminal device by using the second time-frequency resource and the third time-frequency resource.

2. The method according to claim 1, wherein the first time-frequency resource is associated with one or more control resource elements (CCEs), and a number of the one or more CCEs is equal to an aggregation level.

3. The method according to claim 1, wherein the determining, the first time-frequency resource comprises:
   determining an aggregation level, wherein the aggregation level is associated with the PDCCH candidate; and
   determining the first time-frequency resource according to the aggregation level.

4. The method according to claim 1, wherein the second time-frequency resource and the third time-frequency resource are determined according to a first rule, and the first rule indicates the preset location.

5. A communication device, comprising:
   a storage medium including executable instructions; and
   a processor;
   wherein the executable instructions, when executed by the processor, cause the device to:
      determine a first time-frequency resource, wherein the first time-frequency resource is a physical downlink control channel (PDCCH) candidate in a plurality of PDCCH candidates;
      determine a second time-frequency resource and a third time-frequency resource in the first time-frequency resource, wherein the first time-frequency resource consists of a plurality of resource element (RE) sets, all of the plurality of RE sets comprises a same fixed quantity of REs, and the third time-frequency resource is located at a preset location in each of the plurality of RE sets, wherein each RE set comprises a plurality of RE groups (REGs), wherein the third time-frequency resource includes at least one RE in each REG of the plurality of REGs in each RE set, and the second time-frequency resource comprises a resource other than the third time-frequency resource in the first time-frequency resource, the second time-frequency resource is used to carry a beamformed control channel, and the third time-frequency resource is used to carry a reference signal of the beamformed control channel; and transmit the beamformed control channel and the reference signal of the beamformed control channel to a terminal device by using the second time-frequency resource and the third time-frequency resource.

6. The device according to claim 5, wherein the first time-frequency resource is associated with one or more control resource elements (CCEs), and a number of the one or more CCEs is equal to an aggregation level.

7. The method according to claim 5, wherein the determine the first time-frequency resource comprises:
    determine an aggregation level, wherein the aggregation level is associated with the PDCCH candidate; and
    determine the first time-frequency resource according to the aggregation level.

8. The method according to claim 5, wherein the second time-frequency resource and the third time-frequency resource are determined according to a first rule, and the first rule indicates the preset location.

9. A non-transitory computer-readable medium, wherein the non-transitory computer-readable medium stores instructions that, when executed by a processor, cause the processor to:
    determine a first time-frequency resource, wherein the first time-frequency resource is a physical downlink control channel (PDCCH) candidate in a plurality of PDCCH candidates;
    determine a second time-frequency resource and a third time-frequency resource in the first time-frequency resource, wherein the first time-frequency resource consists of a plurality of resource element (RE) sets, all of the plurality of RE sets comprises a same fixed quantity of REs, and the third time-frequency resource is located at a preset location in each of the plurality of RE sets, wherein each RE set comprises a plurality of RE groups (REGs), wherein the third time-frequency resource includes at least one RE in each REG of the plurality of REGs in each RE set, and the second time-frequency resource comprises a resource other than the third time-frequency resource in the first time-frequency resource, the second time-frequency resource is used to carry a beamformed control channel, and the third time-frequency resource is used to carry a reference signal of the beamformed control channel; and transmit the control channel by using the second time-frequency resource and the reference signal by using the third time-frequency resource.

10. The non-transitory computer-readable medium according to claim 9, wherein the first time-frequency resource is associated with one or more control resource elements (CCEs), and a number of the one or more CCEs is equal to an aggregation level.

11. The non-transitory computer-readable medium according to claim 9, wherein the determine the first time-frequency resource comprises:
    determine an aggregation level, wherein the aggregation level is associated with the PDCCH candidate; and
    determine the first time-frequency resource according to the aggregation level.

12. The non-transitory computer-readable medium according to claim 9, wherein the second time-frequency resource and the third time-frequency resource are determined according to a first rule, and the first rule indicates the preset location.

* * * * *